(12) United States Patent
Ito et al.

(10) Patent No.: US 10,885,287 B2
(45) Date of Patent: Jan. 5, 2021

(54) ARTICLE MANAGEMENT SYSTEM

(71) Applicant: Murata Manufacturing Co., Ltd., Nagaokakyo (JP)

(72) Inventors: Tatsuya Ito, Nagaokakyo (JP); Naoto Ikeda, Nagaokakyo (JP); Shunji Mandai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 254 days.

(21) Appl. No.: 16/210,291

(22) Filed: Dec. 5, 2018

(65) Prior Publication Data

US 2019/0108373 A1 Apr. 11, 2019

Related U.S. Application Data

(63) Continuation of application No. PCT/JP2017/040925, filed on Nov. 14, 2017.

(30) Foreign Application Priority Data

Dec. 22, 2016 (JP) .................. 2016-249843
Feb. 6, 2017 (JP) .................. 2017-019732

(51) Int. Cl.
*G06K 7/10* (2006.01)
*H04W 4/80* (2018.01)
*G06F 9/50* (2006.01)
*G06Q 10/08* (2012.01)
*H04W 4/35* (2018.01)

(52) U.S. Cl.
CPC ....... *G06K 7/10356* (2013.01); *G06F 9/5077* (2013.01); *G06K 7/10* (2013.01);
(Continued)

(58) Field of Classification Search
CPC .......... G06K 19/0779; G06K 17/0022; G06K 19/07749; G06K 19/07771; G06K 7/10;
(Continued)

(56) References Cited

U.S. PATENT DOCUMENTS 8,350,676 B2 1/2013 Ryou et al.
2006/0244605 A1* 11/2006 Sakama ................ H01Q 23/00
340/572.7
(Continued)

FOREIGN PATENT DOCUMENTS

JP 2004246617 A 9/2004
JP 2007028119 A 2/2007
(Continued)

OTHER PUBLICATIONS

International Search Report issued for PCT/JP2017/040925, dated Jan. 30, 2018.
Written Opinion of the International Searching Authority issued for PCT/JP2017/040925, dated Jan. 30, 2018.

*Primary Examiner* — Ajibola A Akinyemi
(74) *Attorney, Agent, or Firm* — Arent Fox LLP

(57) ABSTRACT

An article management system includes multiple reader devices that read the RFID tags attached to the articles. Moreover, a central terminal partitions an article management area into multiple middle areas that are in turn partitioned into small areas, and then causes reader devices arranged in two or more small areas to work in a predetermined order for each small area, to read information of the RFID tags. The range of radio wave interference distance assumed for a reader device in a first middle area partially overlaps with a second middle area. Thus, when causing the reader devices arranged in the first middle area to work in order, the central terminal controls a reader device in the second middle area that lies outside the range of radio wave interference distance from a reader device working in the first middle area.

20 Claims, 17 Drawing Sheets

(52) U.S. Cl.
CPC ....... *G06K 7/10336* (2013.01); *G06Q 10/087* (2013.01); *H04W 4/35* (2018.02); *H04W 4/80* (2018.02)

(58) Field of Classification Search
CPC ........... G06K 7/10128; G06K 7/10316; G06K 7/10336; G06K 7/10356; G06K 7/10366; G06K 7/10445; G06K 7/10475; H04W 4/35; H04W 4/80
USPC ........................................................ 455/41.2
See application file for complete search history.

(56) References Cited

U.S. PATENT DOCUMENTS

| | | | |
|---|---|---|---|
| 2010/0201494 | A1 | 8/2010 | Hoon et al. |
| 2011/0240746 | A1* | 10/2011 | Yun .................. G06K 19/07749 235/492 |
| 2012/0306626 | A1* | 12/2012 | Abe ..................... B65G 1/0435 340/10.4 |
| 2013/0265205 | A1* | 10/2013 | Okano ..................... H01Q 1/40 343/787 |

FOREIGN PATENT DOCUMENTS

| | | | |
|---|---|---|---|
| JP | 2007535762 | A | 12/2007 |
| JP | 2009043017 | A | 2/2009 |
| JP | 2010538388 | A | 12/2010 |
| JP | 2015023457 | A | 2/2015 |
| JP | 5689565 | B1 | 3/2015 |

\* cited by examiner ly to this hanger rack, since the hanger rack itself comprises the reader device, inventory management of plural pieces of clothing can be done in real time.

ARTICLE MANAGEMENT SYSTEM

CROSS REFERENCE TO RELATED APPLICATIONS

This is a continuation application of international Application No. PCT/JP2017/040925, with an international filing date of Nov. 14, 2017, which claims priority of Japanese Patent Application No. 2016-249843 filed on Dec. 22, 2016, and Japanese Patent Application No. 2017-019732 filed on Feb. 6, 2017, the entire contents of each of the applications are incorporated herein by reference.

FIELD OF THE INVENTION

The present disclosure relates to an article management system making use of an RFID system.

BACKGROUND

Inventory management of clothing, and the like, which utilizes an RFID system has hitherto been performed (see, e.g. JP-A-2004-246617 and JP-A-2015-23457). In such RFID systems, a salesclerk uses a hand-type reader/writer to scan and read one by one an RFID tag attached to each piece of clothing.

In these RFID systems, however, inventory management of plural pieces of clothing can be performed batchwise, but cannot be carried out in real time. Thus, when the number of pieces of clothing is large, it takes a considerable time to scan every item.

On the contrary, up until now, a hanger rack has been known that comprises a reader device having a loop antenna (see, e.g. JP-A-2007-535762 and JP-B-5689565). According to this hanger rack, since the hanger rack itself comprises the reader device, inventory management of plural pieces of clothing can be done in real time.

In the conventional reader device, however, the loop antenna is incorporated in a hanger pipe and a pole of the hanger rack or the hanger pipe and the pole themselves form part of the loop antenna. For this reason, the position of the antenna is constrained by the positions of the hanger pipe and the pole. As a result, if the radio wave intensity of the antenna is small, an unreadable RFID tag may occur among the RFID tags of the plural pieces of clothing hanging from the hanger pipe. In the case of increasing the radio wave intensity of the antenna to suppress this, interference with radio waves of a reader device of another hanger rack may occur. Especially, for managing inventory, and the like, in shops or backyards handling a large amount of clothing, a lot of reader devices need to be arranged, which may enhance the possibility to allow radio wave interference among a plurality of reader devices. When radio wave interference occurs among the plurality of reader devise, a certain reader device may appear that detects the radio waves as a noise and thus cannot operate at a proper timing. Accordingly, existing reader devices can be improved in terms of reading RFID tags of a plurality of articles more reliably and more rapidly.

SUMMARY OF THE INVENTION

Thus, an object of the present disclosure is to provide an article management system configured to read RFID tags of a plurality of articles more reliably and more rapidly, while suppressing radio wave interference among a plurality of reader devices.

In an exemplary aspect, an article management system is disclosed the includes a plurality of reader devices arranged in an article management area and communicating with an RFID tag attached to an article, to read information recorded on the RFID tag; and a central terminal controlling operations of the plurality of reader devices. Moreover, the central terminal virtually partitions the article management area into a plurality of middle areas and further virtually partitions each middle area into a plurality of small areas. Thus, the central terminal causes two or more reader devices arranged in two or more small areas in each of the plurality of middle areas to work one by one in an order previously determined for each small area, to read information of the RFID tag, a range of a radio wave interference distance assumed for at least one reader device arranged in a first middle area among the plurality of middle areas partially overlapping with a second middle area adjacent to the first middle area, when causing the two or more reader devices arranged in the first middle area to work in order, the central terminal operating a reader device in the second middle area that lies outside the range of the radio wave interference distance from a reader device working in the first middle area.

According to the present disclosure, an article management system is provided that is configured to read RFID tags of a plurality of articles more reliably and more rapidly, while suppressing radio wave interference among a plurality of reader devices.

DETAILED DESCRIPTION

Figure 1:
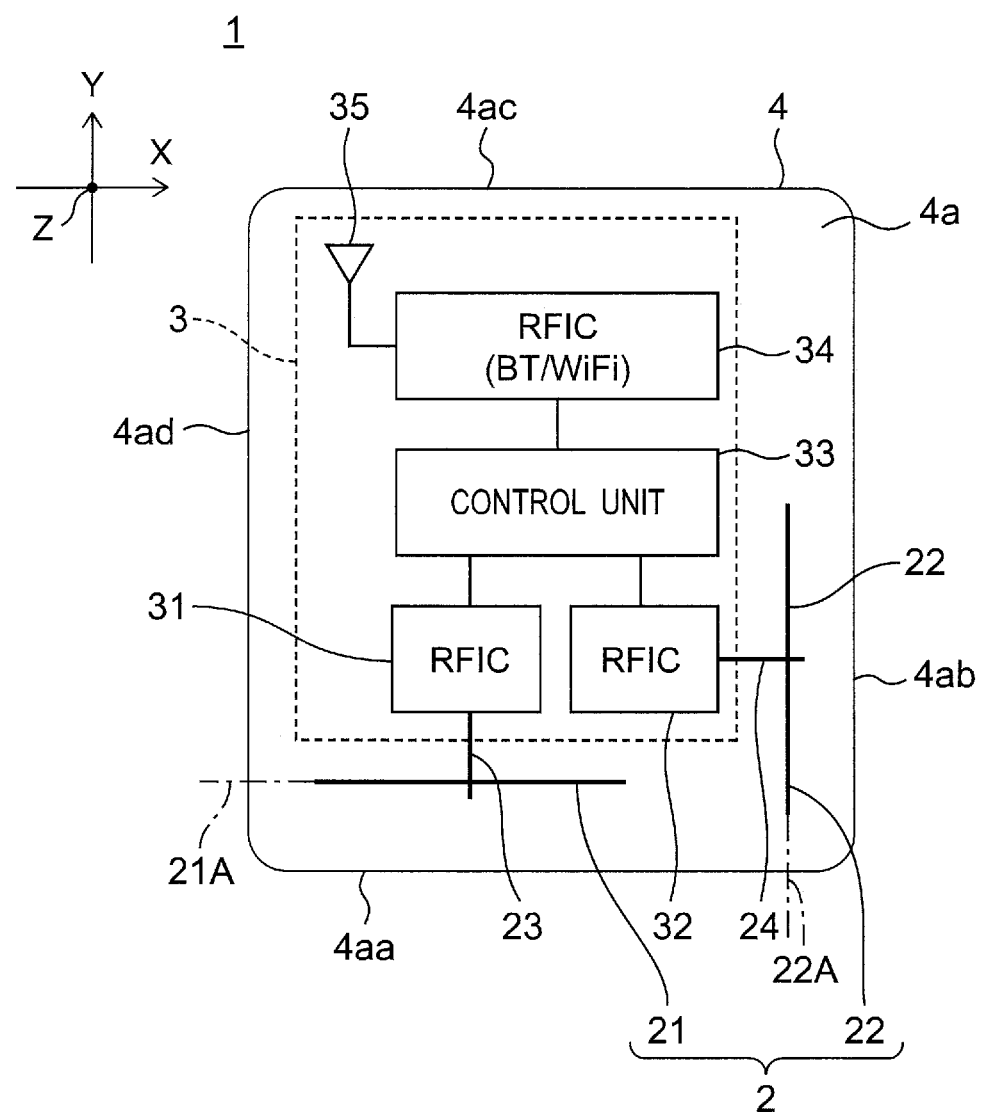
FIG. 1 is a block diagram showing a schematic configuration of a reader device for use in an article management system according to a first exemplary embodiment of the present disclosure.

An article management system according to an exemplary aspect of is disclosed that includes a plurality of reader devices arranged in an article management area and communicating with an RFID tag attached to an article, to read information recorded on the RFID tag; and a central terminal controlling operations of the plurality of reader devices. Moreover, the central terminal virtually partitions the article management area into a plurality of middle areas and further virtually partitions each middle area into a plurality of small areas, such the central terminal causes two or more reader devices arranged in two or more small areas in each of the plurality of middle areas to work one by one in an order previously determined for each small area, to read information of the RFID tag, a range of a radio wave interference distance assumed for at least one reader device arranged in a first middle area among the plurality of middle areas partially overlapping with a second middle area adjacent to the first middle area. Moreover, when causing the two or more reader devices arranged in the first middle area to work in order, the central terminal operates a reader device in the second middle area that lies outside the range of the radio wave interference distance from a reader device working in the first middle area.

According to this configuration, when causing two or more reader devices arranged in the first middle area to work in order, a reader device in the second middle area is operated that lies outside the range of the radio wave interference distance from a reader device working in the first middle area. This enables reader devices arranged in the middle areas to work at the same time, with the result that the RFID tags of a plurality of articles can be read more rapidly. Furthermore, radio wave interference among a plurality of reader devices can be suppressed so that the RFID tags of the plurality of articles can be read more reliably.

Preferably, the central terminal equally or substantially equally partitions the article management area into a plurality of middle areas, and the distance between centers of the first middle area and the second middle area is longer than the radio wave interference distance. According to this configuration, radio wave interference among a plurality of reader devices can further be suppressed so that the RFID tags of the plurality of articles can be read even more reliably.

The central terminal preferably causes a reader device arranged in the first middle area and a reader device arranged in the second middle area to work in time division. According to this configuration, radio wave interference among a plurality of reader devices can further be suppressed so that the RFID tags of the plurality of articles can be read even more reliably.

The central terminal is preferably configured to cause a specific reader device to work in each of the plurality of middle areas so that other reader devices work in an order previously determined for each small area, as a result of operation of the specific reader device. According to this configuration, the central terminal need not operate all of the reader devices and has only to operate a specific reader device, thus achieving a reduction in data traffic of the central terminal. The risk that a reader device does not work due to failing to receive radio waves for operation start, and the like, transmitted from the central terminal can also be minimized.

Preferably, the reader device is configured to be movable, with at least one position tag having position identification information recorded thereon being fixed in each of the middle areas, and the central terminal is configured to cause the reader device and the position tag to communicate with each other, to thereby identify a position of the reader device. According to this configuration, irrespective of movement of a reader device, the position of the reader device can be identified by allowing the reader device and the position tag to communicate with each other. As a result, the RFID tags of a plurality of articles can be read more reliably.

The central terminal is preferably configured to receive in time division, for each area, information of the RFID tags read by the reader devices arranged in each of the middle areas. According to this configuration, since the central terminal receives a large amount of RFID tag information at the same time, failing in reception can be suppressed.

Each reader device may comprise a first antenna and a second antenna, and the central terminal may cause the first antennas of 2 or more reader devices arranged in 2 or more small areas in each of the plurality of middle areas to work in an order previously determined for each small area, and thereafter cause the second antennas of the 2 or more reader devices to work in an order previously determined for each small area. According to this configuration as well, radio wave interference among a plurality of reader devices can be suppressed, enabling the RFID tags of a plurality of articles to be read more reliably and more rapidly.

Preferably, each reader device comprises a timer and a storing unit, and the central terminal is configured to cause the storing unit of each reader device to store a start time to start a reading operation of the RFID tag, while each reader device is configured to start the reading operation of the RFID tag automatically when the timer reaches the start time. According to this configuration, after the central terminal has allowed the storing unit of each reader device to store the start time, each reader device automatically starts the RFID tag reading operation, thus ensuring a more reliable operation of each reader device.

Configuration is preferably such that if an actual reception time at which the central terminal has received information of the RFID tag read by each reader device and an expected reception time previously set for each reader device differ, the central terminal corrects the timer, based on a difference between the actual reception time and the expected reception time. According to this configuration, since the central terminal corrects the timer when the actual reception time and the expected reception time differ, radio wave interference among a plurality of reader devices can be suppressed, enabling each reader device to automatically continue to work.

An article management system according to embodiments will now be described with reference to the accompanying drawings. In the drawings, the same reference numerals are imparted to substantially the same members.

First Embodiment

FIG. 1 is a block diagram showing a schematic configuration of a reader device for use in an article management system according to a first exemplary embodiment of the present disclosure.

As shown in FIG. 1, a reader device 1 according to the first embodiment comprises an antenna element 2 communicating with an RFID tag attached to an article such as clothing, and a reader module 3 electrically connected to the antenna element 2 to read information of the RFID tag through the antenna element 2. The antenna element 2 and the reader module 3 are held in the case 4.

Figure 2:
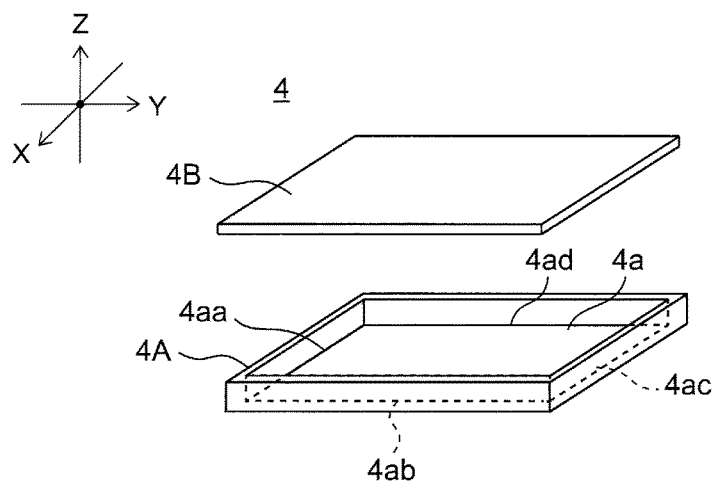
FIG. 2 is an exploded perspective view of a case included in the reader device of FIG. 1.

FIG. 2 is an exploded perspective view of a case 4. As shown in FIG. 2, the case 4 is a thin rectangular-parallelepiped housing having a shorter length in a Z-direction that is a thickness direction according to the exemplary embodiment. The case 4 is made of a nonmetal material such as resin so as to allow radio waves to pass through. The case 4 comprises a container 4A whose top is open and a lid 4B covering the top opening of the container 4A. A bottom wall of the container 4A is shaped into a rectangle or substantial rectangle when viewed from the Z-direction. In the first embodiment, an upper surface of the bottom wall is a main surface 4a of the case 4.

An elastic member (not shown) such as sponge having notches corresponding to the shapes of the parts, i.e. the antenna element 2 and the reader module 3 may be disposed in the container 4A so that the parts, i.e. the antenna element 2 and reader module 3 are arranged in the notches. This enables the parts, i.e. the antenna element 2 and the reader module 3 to be positioned so as not to be displaced in the container 4A. In other words, the elastic member is configured to hold these parts in a fixed position within the container 4A.

The antenna element 2 comprises, as shown in FIG. 1, a first dipole antenna 21 as an example of a first antenna, and a second dipole antenna 22 as an example of a second antenna. The first dipole antenna 21 and the second dipole antenna 22 are for example electric-field-type antennas whose communication frequency band is a UHF band according to the exemplary aspect.

The first dipole antenna 21 is electrically connected via a coaxial cable 23 to the reader module 3. The first dipole antenna 21 has a first element axis 21A extending in an X-direction (i.e., a first direction) along the main surface 4a of the case 4. The first element axis 21A is disposed in the vicinity of a first side 4aa of the main surface 4a of the case 4, along the first side 4aa.

The second dipole antenna 22 is electrically connected via a coaxial cable 24 to the reader module 3. The second dipole antenna 22 has a second element axis 22A extending in a Y-direction (i.e., a second direction) extending along the main surface 4a of the case 4 and intersecting the X-direction. The second element axis 22A is disposed in the vicinity of a second side 4ab orthogonal to the first side 4aa of the main surface 4a of the case 4, along the second side 4ab. In the first embodiment, the X-direction, the Y-direction, and the Z-direction are orthogonal to one another.

Figure 3:
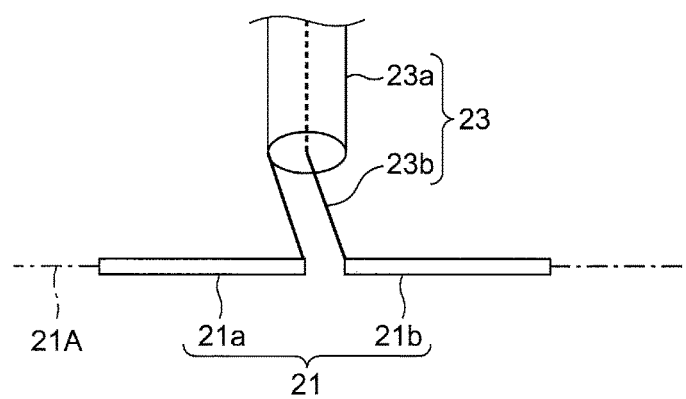
FIG. 3 is a schematic view of a connecting portion between a coaxial cable and a dipole antenna.

FIG. 3 is a schematic view of a connecting portion between the first dipole antenna 21 and the coaxial cable 23. As shown in FIG. 3, the first dipole antenna 21 comprises a first radiating conductor (i.e., first element) 21a and a second radiating conductor (i.e., second element) 21b. The first radiating conductor 21a and the second radiating conductor 21b extend on the first element axis 21A. The first radiating conductor 21a and the second radiating conductor 22a each have a length (element length) of ¼ wavelength. The first radiating conductor 21a and the second radiating conductor 21b are each shaped into a rectilinear bar.

The coaxial cable 23 comprises a tubular outer conductor 23a and a linear inner conductor 23b disposed within the interior of the outer conductor 23a. The outer conductor 23a is connected to an end on one hand of the first radiating conductor 21a of the first dipole antenna 21. The inner conductor 23b is connected to an end on one hand of the second radiating conductor 21b of the first dipole antenna 21.

According to the exemplary aspect, the second dipole antenna 22 has a similar configuration to the first dipole antenna 21. The coaxial cable 23 has a similar configuration to the coaxial cable 24. Therefore, the connecting part between the second dipole antenna 22 and the coaxial cable 24 has a similar configuration to the connecting portion between the first dipole antenna 21 and the coaxial cable 23. For this reason, description of those configurations will be omitted herein.

As shown in FIG. 1, the reader module 3 comprises a first RFIC element 31, a second RFIC element 32 for RFID communication, a control unit 33, and an RFIC element 34, and an antenna 35 for external communication.

The first RFIC element 31 is an integrated circuit element for a reader device in a UHF-band RFID system. The first RFIC element 31 is configured to be connected to the first dipole antenna 21 by the coaxial cable 23 so as to feed a high-frequency signal to the first dipole antenna 21.

The second RFIC element 32 is an integrated circuit element for a reader device in the UHF-band RFID system. The second RFIC element 32 is configured to be connected to the second dipole antenna 22 by the coaxial cable 24 so as to feed a high-frequency signal to the second dipole antenna 22. The first RFIC element 31 and the second RFIC element 32 are connected to the control unit 33.

According to the exemplary aspect, the control unit 33 is configured to switch high-frequency signal feeding operations of the first RFIC element 31 and the second RFIC element 32 in time division. The interval to switch the high-frequency signal feeding operation of the first RFIC element 31 and the high-frequency signal feeding operation of the second RFIC element 32 in time division is 1 sec for example. The control unit 33 is connected to the RFIC element 34. Moreover, according to an exemplary aspect, the control unit can be a microprocessor configured to execute the algorithms described herein.

The RFIC element 34 is an integrated circuit element for short-range wireless communication system such as wireless LAN, Bluetooth (registered trademark), and SUB GIGA (Sub-GHz band) and is connected to the antenna 35 for external communication.

The antenna 35 for external communication is a UHF-band or SHF-band electric-field-type antenna that communicates with a shop-side antenna for example by use of the short-range wireless communication system such as wireless LAN, Bluetooth (registered trademark), and SUB GIGA (Sub-GHz band).

Figure 4:
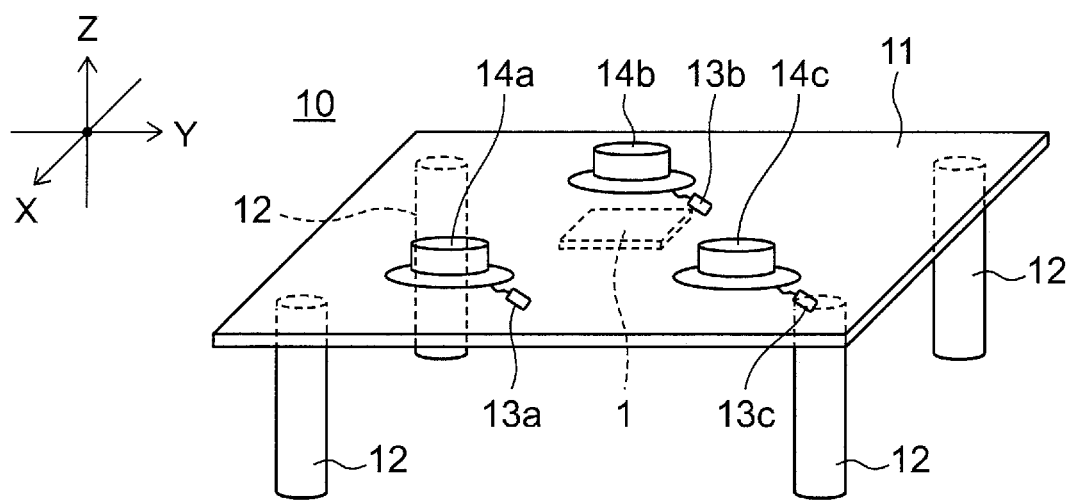
FIG. 4 is a perspective view showing a schematic configuration of a table with reader device having the reader device of FIG. 1.

FIG. 4 is a perspective view showing a schematic configuration of a table 10 with the reader device 1. As shown in FIG. 4, the table 10 with reader device 1 comprises a top plate 11 and four legs 12 supporting the top plate 11 from below.

The top plate 11 is formed in a rectangular flat plate shape for example. Articles 14a to 14c with RFID tags 13a to 13c, respectively, are placed (displayed) on a front surface side of the top plate 11. In the first embodiment, the RFID tags 13a to 13c are attached by strings to the articles 14a to 14c, respectively. Although in FIG. 4 an example is shown where the articles 14a to 14c are hats, the articles can be any ones as long as the inventory management or management on security is feasible by the RFID tags as would be appreciated to one skilled in the art.

in the exemplary aspect, the reader device 1 is attached to a back surface side of the top plate 11. In the first embodiment, the reader device 1 is attached to the back surface side of the top plate 11 such that a front surface of the lid 4B of the case 4 is attached to a center of a back surface of the top plate 11. The reader device 1 is disposed such that the main surface 4a of the case 4 is parallel to a main surface of the top plate 11.

Figure 5:
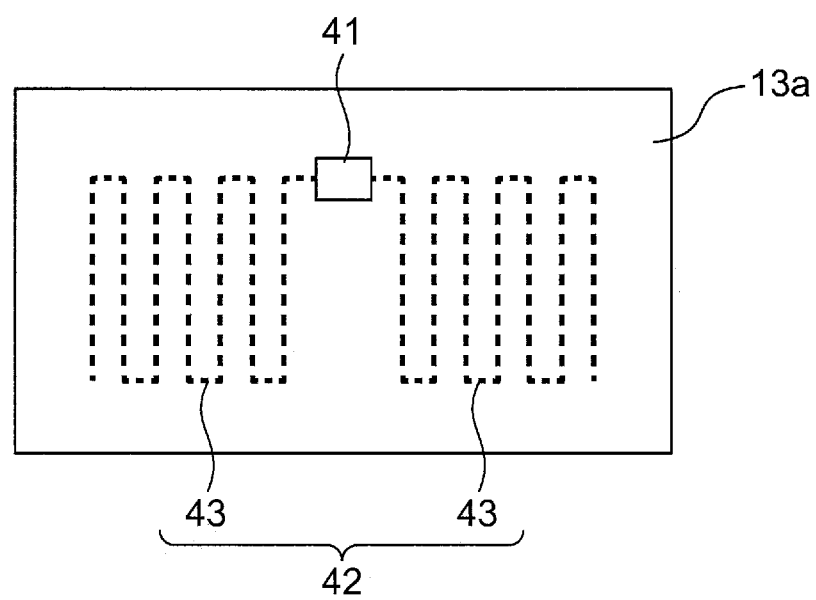
FIG. 5 is a schematic view showing an example of an RFID tag attached to an article.

FIG. 5 is a schematic view showing an example of the RFID tag 13a. The RFID tag 13a comprises, as shown in FIG. 5, an RFIC element that is an integrated circuit element for tag in the RFID system, and a dipole antenna 42. The dipole antenna 42 comprises two antenna elements 43, 43 extending in a meandering manner toward both sides, with the RFIC element 41 interposed therebetween. Since the RFID tags 13b and 13c have the same configuration as the RFID tag 13a, description thereof will be omitted herein. These RFID tags 13a to 13c are passive tags utilizing the UHF band as the communication frequency band and make up the UHF-band RFID system as a whole.

According to the reader device 1 of the first embodiment, the antenna element 2 comprises the first dipole antenna 21 and the second dipole antenna 22 as described above. The first dipole antenna 21 has a doughnut-shaped radiation pattern around the first element axis 21A. The second dipole antenna 22 has a doughnut-shaped radiation pattern around the second element axis 22A. This enables the readable area to become wider.

According to the reader device 1 of the first embodiment, the first dipole antenna 21 and the second dipole antenna 22 are arranged such that the first element axis 21A and the second element axis 22A intersect. In consequence, for example, even though the RFID tags 13a to 13c lie in a direction of extension of the first element axis 21A, the second dipole antenna 22 can read those RFID tags 13a to 13c. Thus, the readable area can be further widened. As a result, the number of the reader devices 1 to be disposed on one table can be reduced, making it possible to lower the costs.

According to the reader device 1 of the first embodiment, the control unit 33 switches the high-frequency signal feeding operations of the first RFIC element 31 and the second RFIC element 32 in time division, whereby radio wave interference can be suppressed.

According to the reader device 1 of the first embodiment, the RFIC element feeding high-frequency signals to the first dipole antenna 21 and the RFIC element feeding high-frequency signals to the second dipole antenna 22 are separately disposed. According to this configuration, the high-frequency signals of the RFIC element are fed to only either one of the first dipole antenna 21 and the second dipole antenna 22, instead of being distributed to the first dipole antenna 21 and the second dipole antenna 22. Accordingly, radio waves of the first dipole antenna 21 and the second dipole antenna 22 can be strengthened.

According to the reader device 1 of the first embodiment, the first element axis 21A is disposed in the vicinity of the first side 4aa of the main surface 4a of the case 4, along that first side 4aa. The second element axis 22A is disposed in the vicinity of the second side 4ab orthogonal to the first side 4aa of the main surface 4a of the case 4, along that second side 4ab. As a result, the first dipole antenna 21 and the second dipole antenna 22 are arranged so as to orthogonally intersect or substantially orthogonally intersect. It is noted that the term "substantially" takes into account minor variations in the intersection angle that may occur during manufacturing such that the orthogonally intersecting angle is not exactly ninety degrees. In either event, it is thus possible to reduce the overlapping area between the doughnut-shaped radiation pattern around the first element axis 21A and the doughnut-shaped radiation pattern around the second element axis 22A, and thereby to further widen the readable area.

According to the reader device 1 of the first embodiment, since the reader module 3 comprises the antenna 35 for external communication, information of the RFID tag read by the reader module 3 can be transmitted to an external terminal such as a shop-side terminal.

It is noted that the present disclosure is not limited to the first embodiment, and can be carried out in various other modes. For example, although in the above, the interval for the control unit 33 to switch the high-frequency signal feeding operations of the first RFIC element 31 and the second RFIC element 32 in time division was equi-interval (1 sec), the present disclosure is not limited thereto. For example, depending on the number of the RFID tags read through the first dipole antenna 21 and on the number of the RFID tags read through the second dipole antenna 22, the control unit 33 may change the rate to switch the high-frequency signal feeding operations of the first RFIC element 31 and the second RFIC element 32 in time division. For example, if the number of the RFID tags read through the first dipole antenna 21 is "3" and the number of the RFID tags read through the second dipole antenna 22 is "0", there is no readable RFID tag even though a high-frequency signal is fed to the second dipole antenna 22. In this case, to read the RFID tag, it is necessary to wait for the high-frequency signal feeding operation of the second RFIC element 32 to finish, resulting in lowering of the RFID tag reading sensitivity. In this case, for example, it is preferred that the period of the high-frequency signal feeding operation of the first RFIC element 31 be prolonged (e.g., 1.5 sec) and that the period of the high-frequency signal feeding operation of the second RFIC element 32 be shortened (e.g., 0.5 sec). Consequently, the first dipole antenna 21 reading more RFID tags is fed with high-frequency signals during a longer period of time, so that the RFID tag reading sensitivity can be improved.

The above change of "the rate to switch in time division" may be performed by the control unit 33 or may be performed by a control unit of an external terminal such as a shop-side terminal according to a variation of the exemplary aspect.

Moreover, the control unit 33 may provide control such that the high-frequency signal feeding operations of the first RFIC element 31 and the second RFIC element 32 are alternately continuously performed or such that the high-frequency signal feeding operations are alternately intermittently performed. For example, the high-frequency signal feeding operation of the first RFIC element 31 is performed for 5 sec and thereafter paused for 2 sec, and the high-frequency signal feeding operation of the second RFIC element 32 is performed for 1 sec and then paused for 2 sec. The control unit 33 may control the high-frequency signal feeding operations of the first RFIC element 31 and the second RFIC element 32 so as to repeat the above. Thus, the energy savings of the reader device 1 can be achieved.

Figure 6:
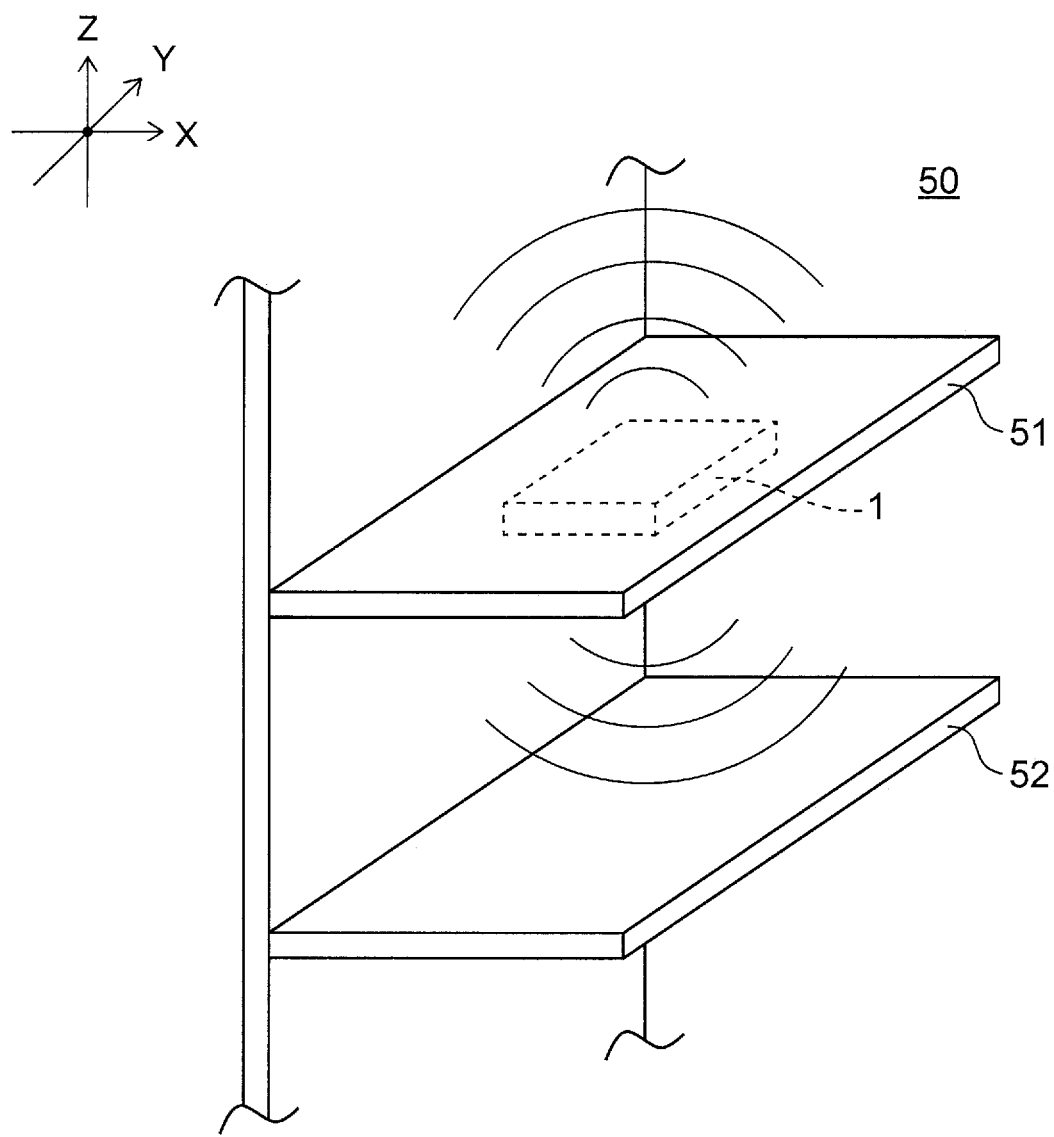
FIG. 6 is a perspective view showing a state where the reader device of FIG. 1 is attached to a multistage shelf.

Although in the above the reader device 1 is fitted to the back surface side of the top plate 11 of the table, the present disclosure is not limited thereto. For example, the reader device 1 may be fitted to the front surface side of the top plate 11 of the table. The reader device 1 may be configured to hang from the hanger pipe instead of the table, or may be fitted to a side wall. The reader device 1 may be fitted to a multistage shelf 50 having two or more shelf boards 51 arranged in an up-and-down direction (Z-direction) as shown in FIG. 6. Specifically, the reader device 1 may be fitted to a back surface of the shelf board 51. According to this configuration, since the reader device 1 comprises the first dipole antenna 21 and the second dipole antenna 22 and has a directivity in the up-and-down direction as well, it can read the RFID tags attached to articles displayed on the shelf boards 51 and 52.

Although in the above the reader module 3 and the dipole antenna 21 and the first dipole antenna 21 are connected by the coaxial cable 23, the present disclosure is not limited thereto. For example, the reader module 3 and the first dipole antenna 21 may be electrically connected by two cables. Similarly, the reader module 3 and the second dipole antenna 22 may be electrically connected by two cables in lieu of the coaxial cable 24.

Figure 7:
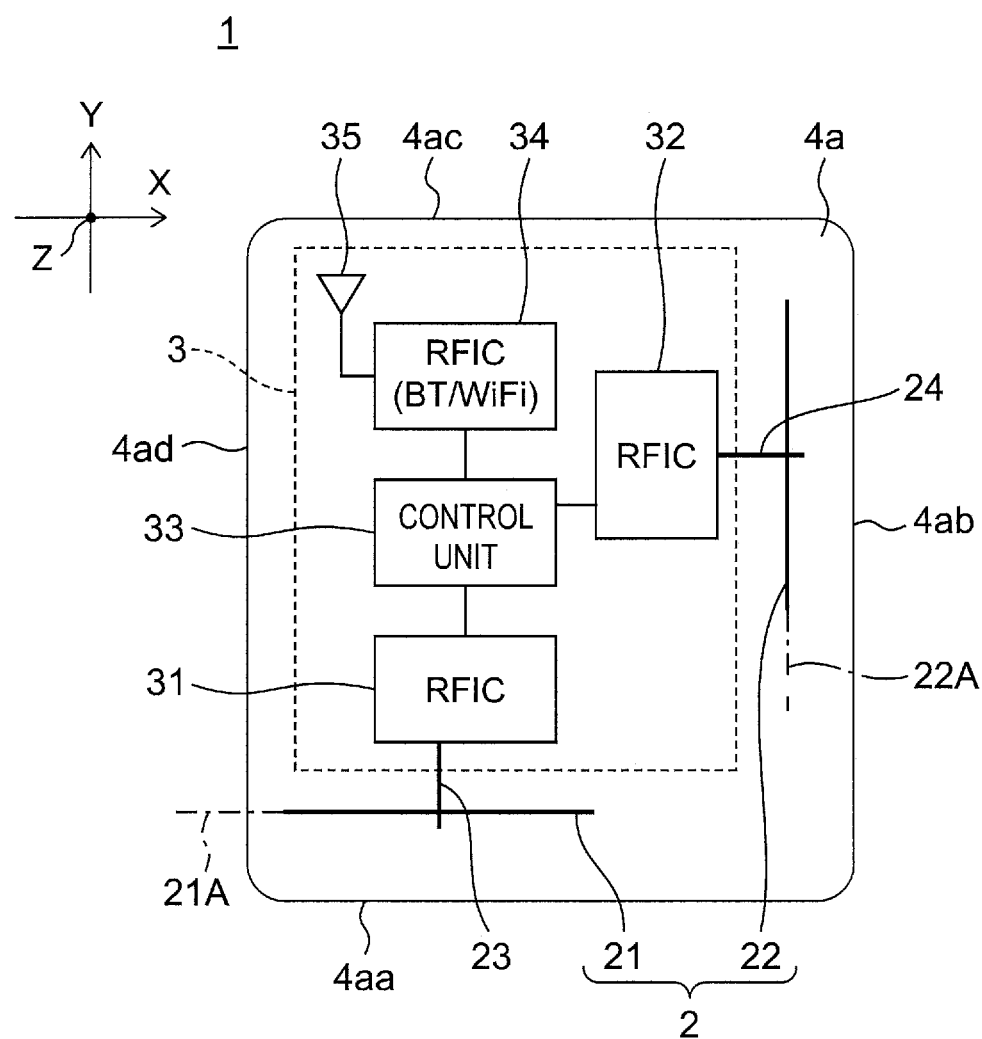
FIG. 7 is a schematic view showing a variant of the reader device of FIG. 1.

Although in the above, as shown in FIG. 1, the second dipole antenna 22 is disposed offset toward the first side 4aa of the main surface 4a of the case 4, the present disclosure is not limited thereto. Preferably, as shown in FIG. 7, the second dipole antenna 22 is disposed offset toward a third side 4ac of the main surface 4a of the case 4, opposite to the first side 4aa. It is also preferred that the first dipole antenna 21 be disposed offset toward a fourth side 4ad of the main surface 4a of the case 4, opposite to the second side 4ab. According to this configuration, the first dipole antenna 21 and the second dipole antenna 22 are positioned apart away in a different direction from a portion where the first side 4aa and the second side 4ab orthogonally intersect. As a result, radio waves of the dipole antenna on one hand can be restrained from being affected by the radiating conductor of the dipole antenna on the other.

In this case, it is preferred that the antenna 35 for external communication be disposed in the vicinity of a portion where the third side 4ac and the fourth side 4ad orthogonally intersect. According to this configuration, the antenna 35 for external communication is positioned away and separate from the first dipole antenna 21 and the second dipole antenna 22. As a result, radio waves of the antenna 35 for external communication can be restrained from interfering with radio waves of the first dipole antenna 21 and with radio waves of the second dipole antenna 22.

Figure 8:
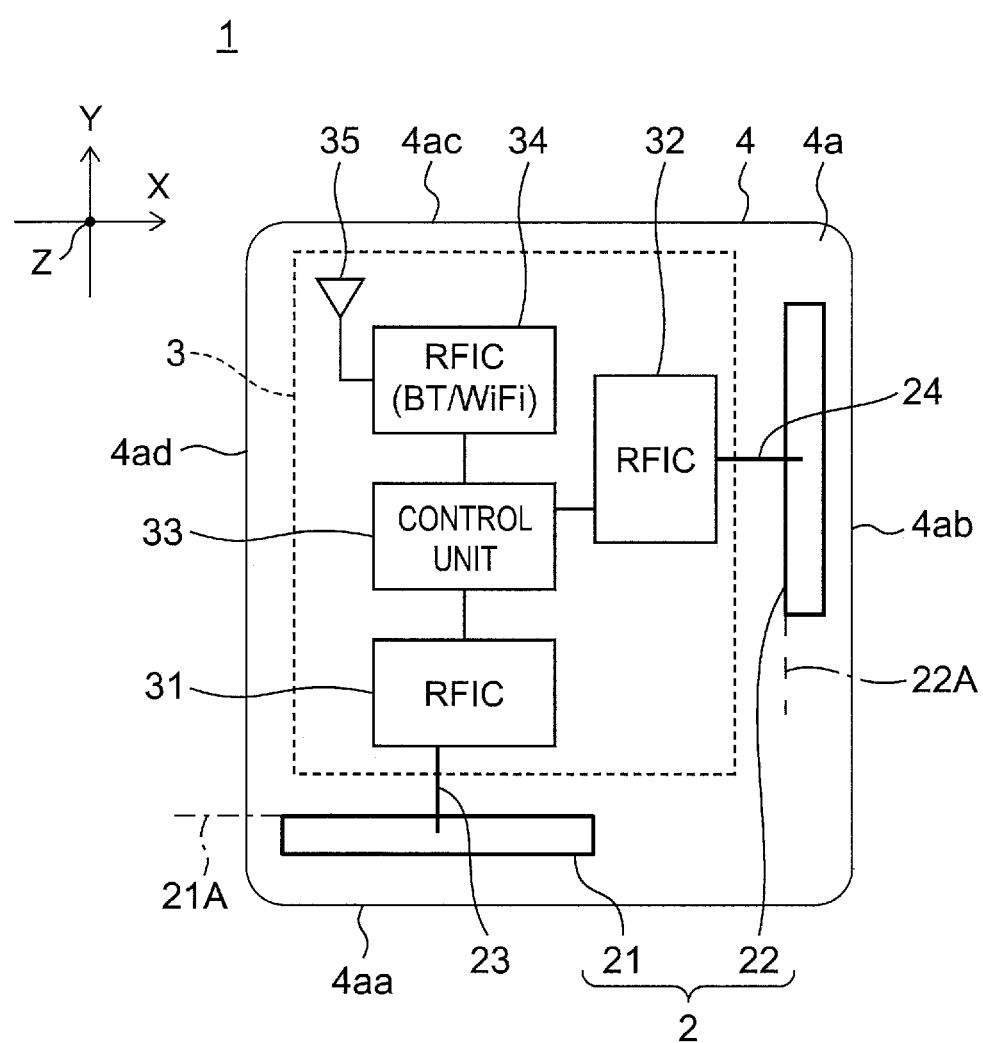
FIG. 8 is a schematic view showing a variant of the reader device of FIG. 1.

Although in the above the first dipole antenna 21 and the second dipole antenna 22 are formed such that the two radiating conductors 21a and 21b are rectilinear bars, it is noted that the present disclosure is not limited thereto. For example, the two radiating conductors 21a and 21b may partially have bent points. As shown in FIG. 8, the first dipole antenna 21 and the second dipole antenna 22 may be folded dipole antennas. The folded dipole antenna is an antenna having a structure in which an additional radiating conductor parallel to the two radiating conductors of ½ wavelength in full length is disposed so that their respective ends are connected together. This folded dipole antenna has characteristics that the electric field is hardly radiated outward (in a direction of the element axis) from the folded portions at both ends. This can further suppress a degradation in the antenna characteristics arising from interference of antennas with each other. Even in the case of disposition of a metal body near the end of the dipole antenna, it can be suppressed for the metal body to impair the directivity or gain of the dipole antenna.

Although in the above the RFID tags 13a to 13c are attached by strings to the articles 14a to 14c, the present disclosure is not limited thereto. For example, the RFID tags 13a to 13c may be disposed at positions physically apart from the articles 14a to 14c as long as they are associated with the articles 14a to 14c. Alternatively, they may also be physically coupled directly to the articles 14a to 14c by an adhesive, for example.

Although in the above example, the reader module 3 comprises the antenna 35 for external communication, the present disclosure is not limited thereto. Instead of having the antenna 35 for external communication, the reader module 3 may comprise a storing unit accumulating information of read RFID tags for example.

The reader module 3 may comprise a driving battery (see a battery 36 of FIG. 9, for example) configured to supply electric power to the first RFIC element 31, the second RFIC element 32, the control unit 33, and the RFIC element 34.

Although in the above the reader device 1 has a reader function to read information of the RFID tag, the present disclosure is not limited thereto. For example, the reader device 1 may be configured to read information of the RFID tag and have a reader/writer function writing information to the RFID tag.

Although in the above the case 4 is a rectangular parallelepiped housing, the present disclosure is not limited thereto. For example, the case 4 may be of a shape not having side walls like an envelope.

Figure 9:
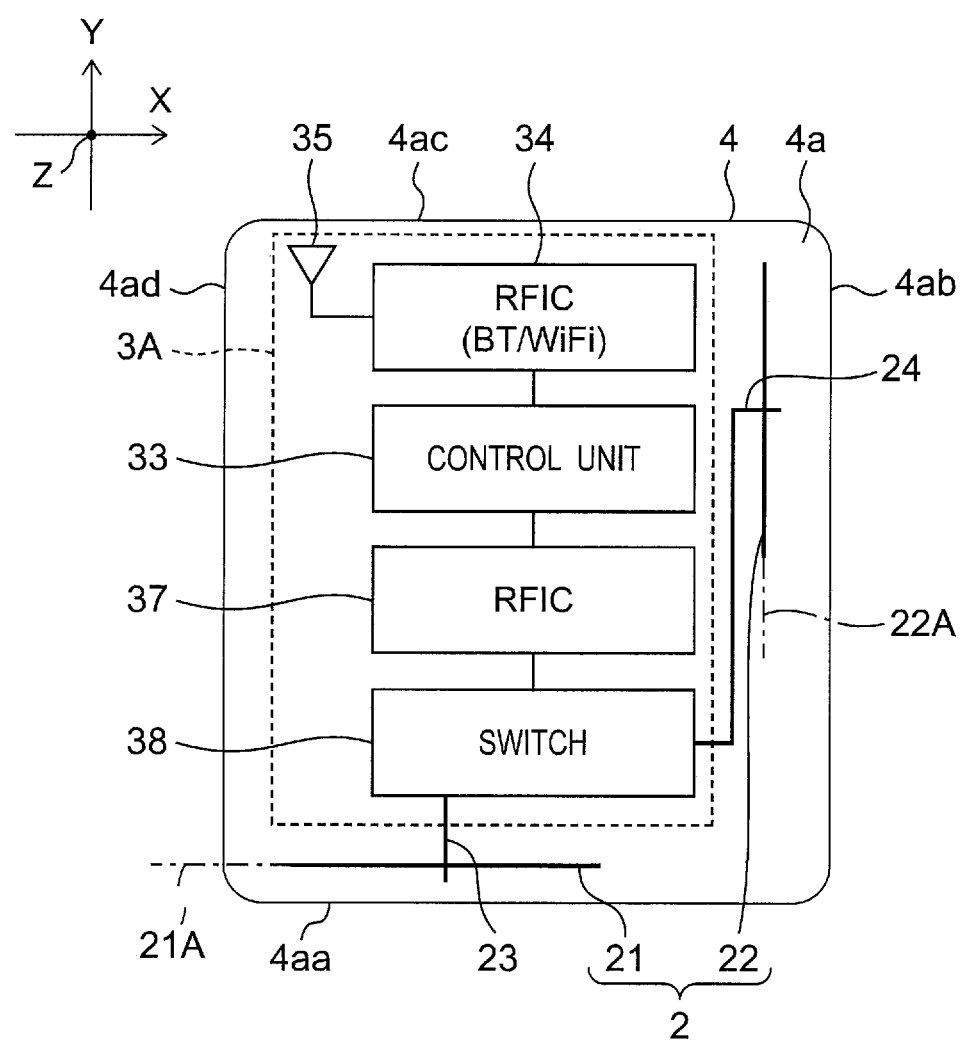
FIG. 9 is a schematic view showing a variant of the reader device of FIG. 1.

Although in the above the reader module 3 comprises the first RFIC element 31 and the second RFIC element 32, the present disclosure is not limited thereto. For example, as shown in FIG. 9, a reader module 3A may be configured to comprise an RFIC element 37 for RFID communication and a switch 38, in place of the first RFIC element 31 and the second RFIC element 32. In this case, the RFIC element 37 feeds a high-frequency signal to the switch 38. The switch 38 is configured to switch which one of the first dipole antenna 21 and the second dipole antenna 22 to feed the high-frequency signal of the RFIC element 37. The switch 38 is connected by the coaxial cable 23 to the first dipole antenna 21 and is connected by the coaxial cable 24 to the second dipole antenna 22. The control unit 33 controls the high-frequency signal feeding operation of the RFIC element 37 and the switching operation of the switch 38. According to this configuration, since the control unit 33 controls the high-frequency signal feeding operation of the RFIC element 37 and the switching operation of the switch 38, radio wave interference can be suppressed.

Figure 10:
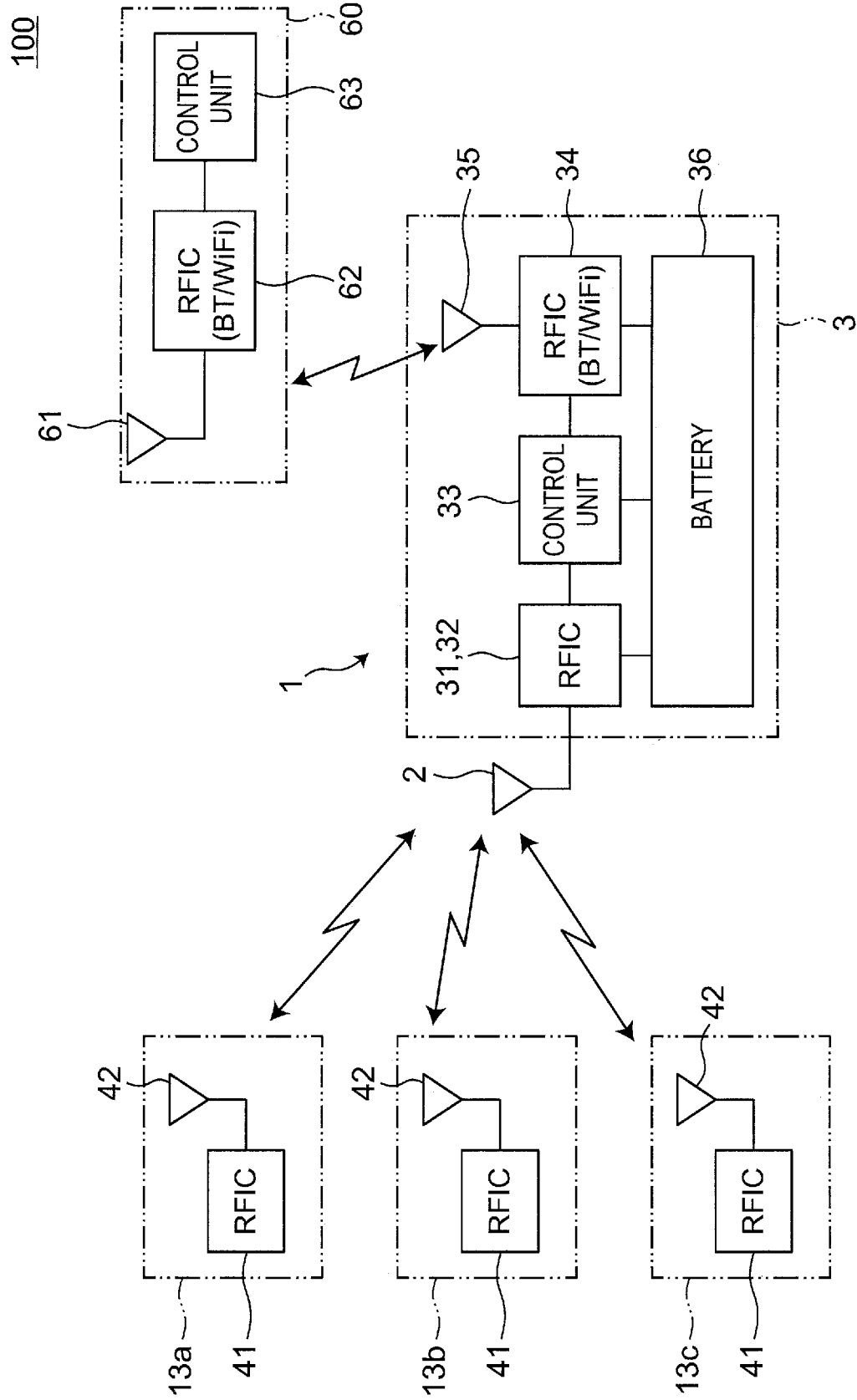
FIG. 10 is a block diagram showing a schematic configuration of the article management system using the reader device of FIG. 1.

An article management system will next be described that manages the plurality of articles 14a to 14c using the reader device 1. FIG. 10 is a block diagram showing a schematic configuration of an article management system using the reader device 1.

As shown in FIG. 10, the article management system 100 comprises the reader device 1 and a shop-side terminal 60 (or controller) that communicates with the reader device 1 to manage a plurality of articles.

The reader module 3 of the reader device 1 comprises a battery 36 in addition to the first RFIC element 31, the second RFIC element 32, the control unit 33, the RFIC element 34, and the antenna 35 for external communication.

In FIG. 10, the first RFIC element 31 and the second RFIC element 32 are shown as a single RFIC element.

The antenna 35 for external communication is an electric-field-type antenna that communicates with a shop-side antenna 61 in the UHF band or the SHF band for example. The antenna 35 for external communication and the shop-side antenna 61 have a communication distance of 10 m or more and 100 m or less for example and perform short-range wireless communication making use of a communication frequency band such as a Sub-GHz band (315 MHz, 433 MHz, 500 MHz, 868 MHz, 915 MHz, 920 MHz, etc.), a 2.4 GHz band, and a 5 GHz band. The antenna element 2 and the dipole antennas 42 of the RFID tags 13a to 13c perform communication utilizing a 900 MHz band. Communication between the antenna 35 for external communication and the shop-side antenna 61 and communication between the antenna element 2 and the dipole antennas 42 employ a different communication system and differ from each other in the modulation/demodulation scheme, the communication frequency band, radio wave intensity and properties, etc. For this reason, radio wave interference can be suppressed. Antennas used in the short-range wireless communication system are a resonance-based antenna. The battery 36 supplies electric power to the first RFIC element 31, the second RFIC element 32, the control unit 33, and the RFIC element 34.

The shop-side terminal 60 comprises the shop-side antenna 61, an RFIC element 62, and a control unit 63. Although not shown, a power source is connected to the RFIC elements and the control unit.

Moreover, the shop-side antenna 61 is an antenna for communicating with the antenna 35 for external communication of the reader device 1. The shop-side antenna 61 is an electric-field-type antenna and performs short-range wireless communication with the antenna 35 for external communication of the reader device 1 in the UHF band or the SHF band for example.

The RFIC element 62 is an integrated circuit element for short-range wireless communication system such as wireless LAN, Bluetooth (registered trademark), and SUB GIGA (Sub-GHz band) and is connected to the shop-side antenna 61.

The control unit 63 is a central terminal and manages information of the RFID tags. More specifically, the control unit 63 manages an article takeout history, etc. For example, the control unit 63 detects in real time whether a specific RFID tag can be read or not and manages a history including the number of times by which an article with the specific RFID tag has been taken out from a table and thereafter returned. This enables inventory management of a plurality of articles to be done more precisely. The control unit 63 may perform the article management in conjunction with accounting.

Although in the above, communication between the shop-side terminal 60 and the reader module 3 of the reader device 1 is wirelessly performed, the present disclosure is not limited thereto. Communication between the shop-side terminal 60 and the reader module 3 of the reader device 1 may be wiredly performed.

Figure 11:
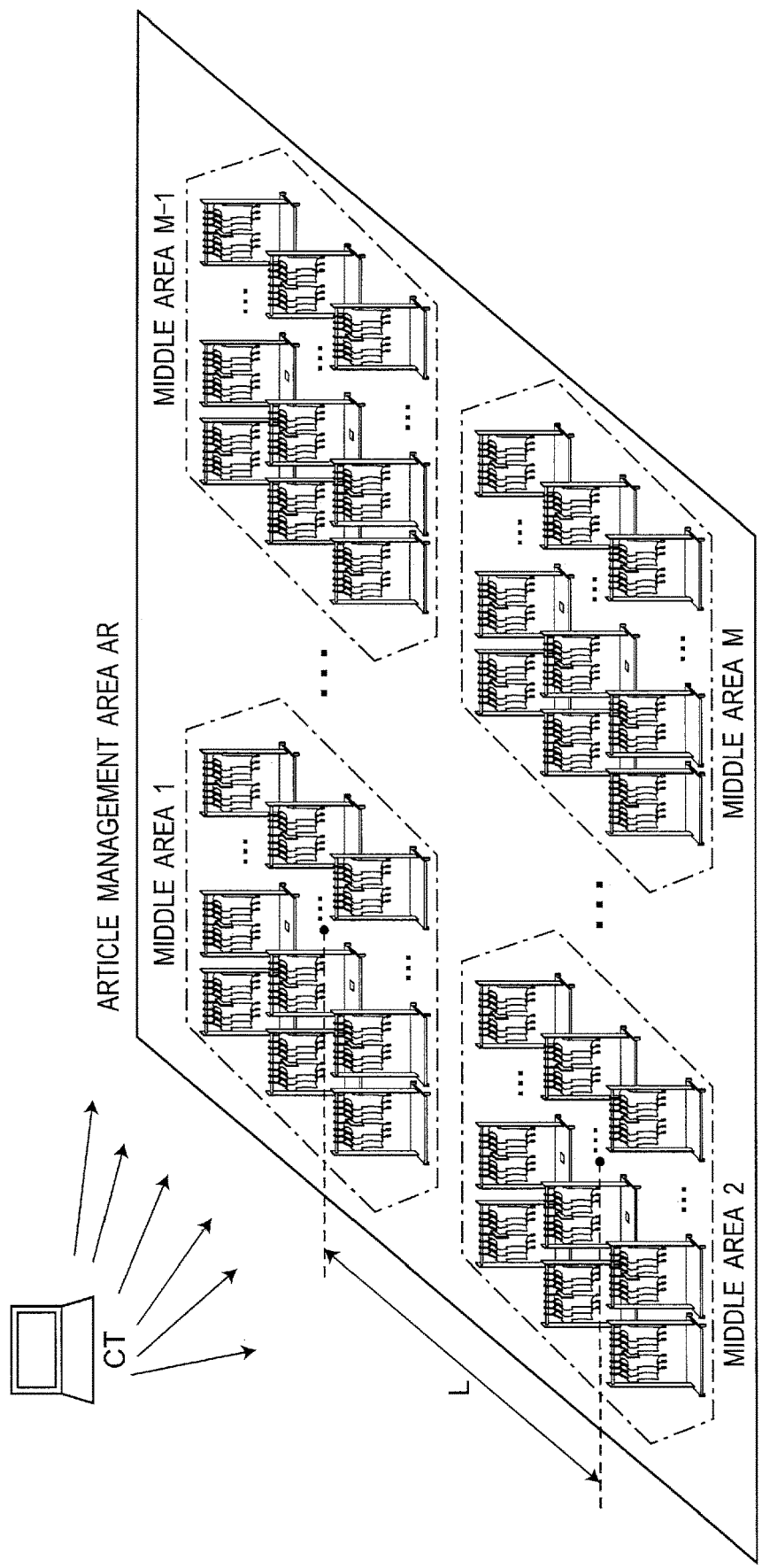
FIG. 11 is a conceptual diagram showing an overall configuration of the article management system of FIG. 10.
Figure 12:
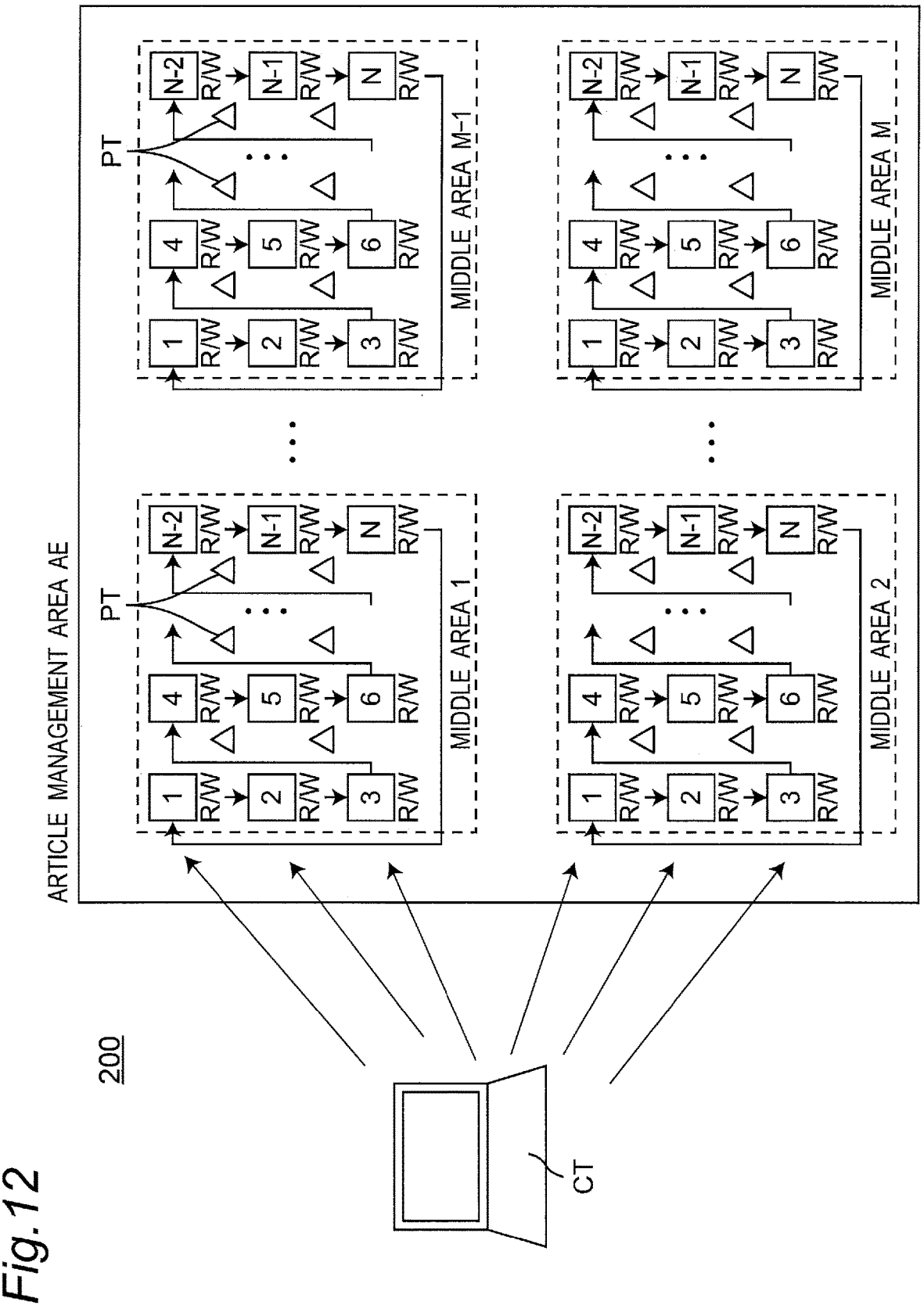
FIG. 12 is a block diagram showing an overall configuration of the article management system of FIG. 11.

Description will then be given of an article management system managing a plurality of articles using a plurality of reader devices 1. FIG. 11 is a perspective view showing a schematic configuration of an article management system 200 according to the first embodiment of the present disclosure. FIG. 12 is a block diagram showing a schematic configuration of the article management system 200. In this case, the reader device 1 has a reader/writer function and is represented as "R/W". In order to distinguish the plurality of reader devices 1 from one another, they are represented as "reader/writer R/W1" to "reader/writer R/WN" (N is a natural number of 2 or more).

When the plurality of reader/writers R/W1 to R/WN are arranged in a short distance as shown in FIG. 12, radio wave interference may occur between the reader/writers R/W1 to R/WN even if difference channels are given. For this reason, in the article management system 200, an article management area (large area) AE is virtually partitioned into a plurality of middle areas 1 to M (M is a natural number) so that a plurality of reader/writers R/W1 to R/WN arranged in each of the middle areas 1 to N are operated one by one in time division.

Specifically, the article management system 200 comprises a plurality of reader/writers R/W1 to R/WN arranged in each of the middle areas 1 to M, and a central terminal CT configured to control RFID tag read operations (hereinafter, referred to simply as "operation") of the plurality of reader/writers R/W1 to R/WN.

The article management area AE is an area such as a shop or a backyard for example, in which a plurality of articles with RFID tags to be migrated are arranged. In FIG. 11, the plurality of articles are shown as clothing hung on the hanger rack.

Figure 13:
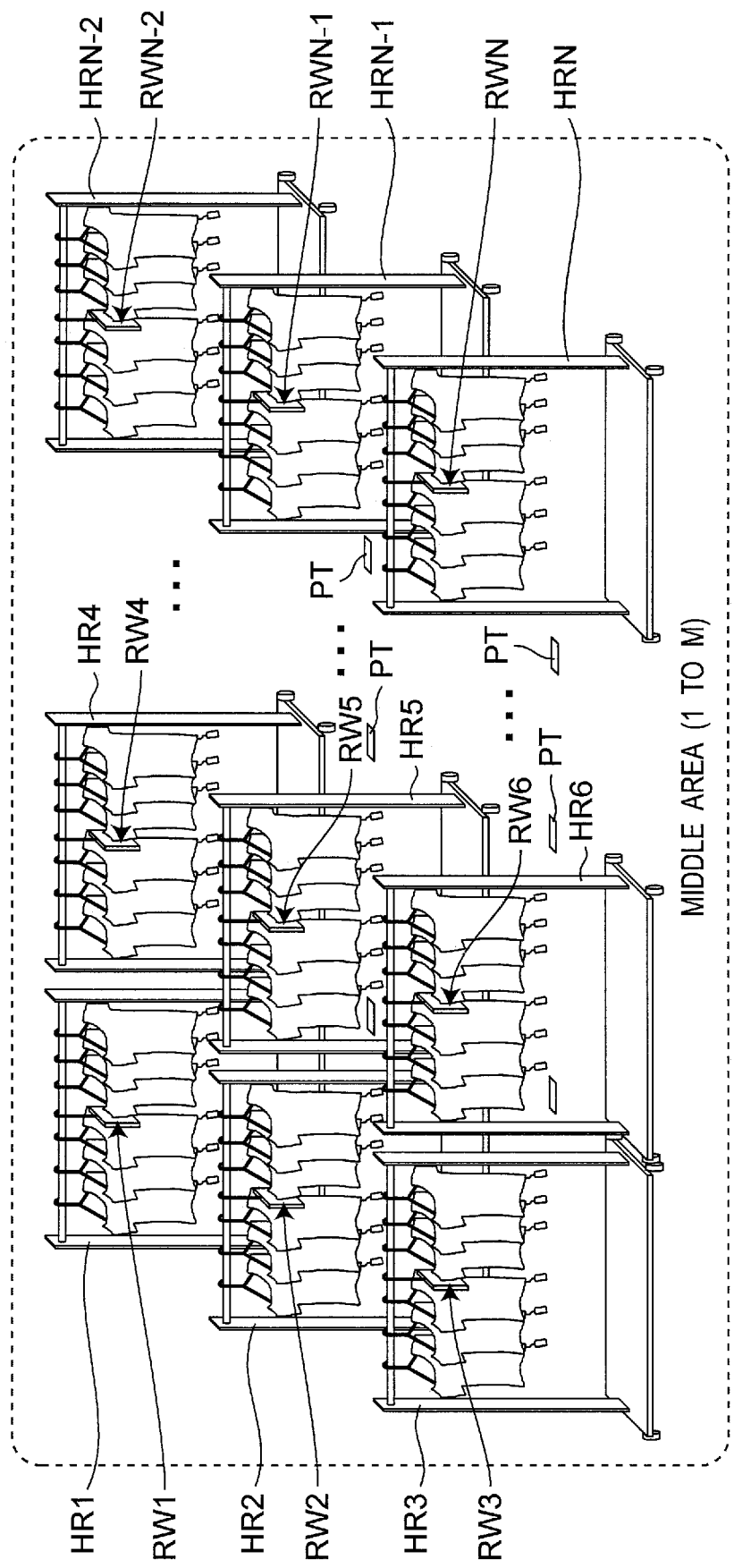
FIG. 13 is a perspective view showing an example in which a plurality of reader/writers are arranged in middle areas, in the article management system of FIG. 11.

FIG. 13 shows an example in which a plurality of hanger racks HR1 to HRN are arranged in the middle areas 1 to M. The hanger racks HR1 to HRN are fitted with the reader/writers R/W1 to R/WN, respectively. The reader/writers R/W1 to R/WN are configured to communicate with RFID tags attached to articles (clothing) to thereby read information recorded on the RFID tags.

The central terminal CT equally or substantially equally partitions the article management area AE into a plurality of middle areas 1 to M. At this time, the central terminal CT partitions it such that the range of the radio wave interference distance assumed for at least one reader/writer R/W arranged in a first middle area (e.g. middle area 1) partially overlaps a second middle area (e.g. middle area 2) adjacent to the first middle area. For example, as shown in FIG. 11, the central terminal CT partitions the article management area AE into a plurality of middle areas 1 to M such that a distance L between centers of mutually adjacent middle areas is longer than the radio wave interference distance assumed for the reader/writer R/W. Consequently, for example, as shown in FIG. 12, the distance between the reader/writers R/W1 arranged at corresponding positions in the mutually adjacent middle areas 1 and 2 is also longer than the "radio wave interference distance assumed". Accordingly, radio wave interference can be suppressed even though the reader/writer R/W1 lying in the middle area 1 and the reader/writer R/W1 lying in the middle area 2 operate at the same time. Similarly, radio wave interference can be suppressed even though the reader/writer R/WN lying in the middle area M−1 and the reader/writer R/WN lying in the middle area M operate at the same time.

According to the exemplary aspect, the central terminal CT virtually partitions each of the middle areas 1 to M further into a plurality of small areas. In the first embodiment, each small area has a size encompassing any one of hanger racks HR1 to HRN. The reader/writers R/W1 to R/WN are disposed one by one in the small areas. For each of the middle areas 1 to M, the central terminal CT operates the reader/writers R/W1 to R/WN arranged in the small areas, one by one in the order determined in advance for each small area, to thereby read information of the RFID tags arranged in each of the middle areas 1 to M. For example, when operating in order two or more reader/writers R/W arranged in a first middle area (e.g. middle area 1), the central terminal CT operates reader/writers R/W in a second middle area (e.g., middle area 2) that lie outside the range of the radio wave interference distance from the reader/writers R/W working in the first middle area. In the first embodiment, the central terminal CT controls so as to cause reader/writers R/W designated by the same reference numerals in FIG. 12 to work at the same time. In FIG. 12, to facilitate viewing the diagram, the central terminal CT is shown to control operations of a plurality of reader/writers R/W1 to R/W3 in the middle areas 1 and 2.

Figure 14:
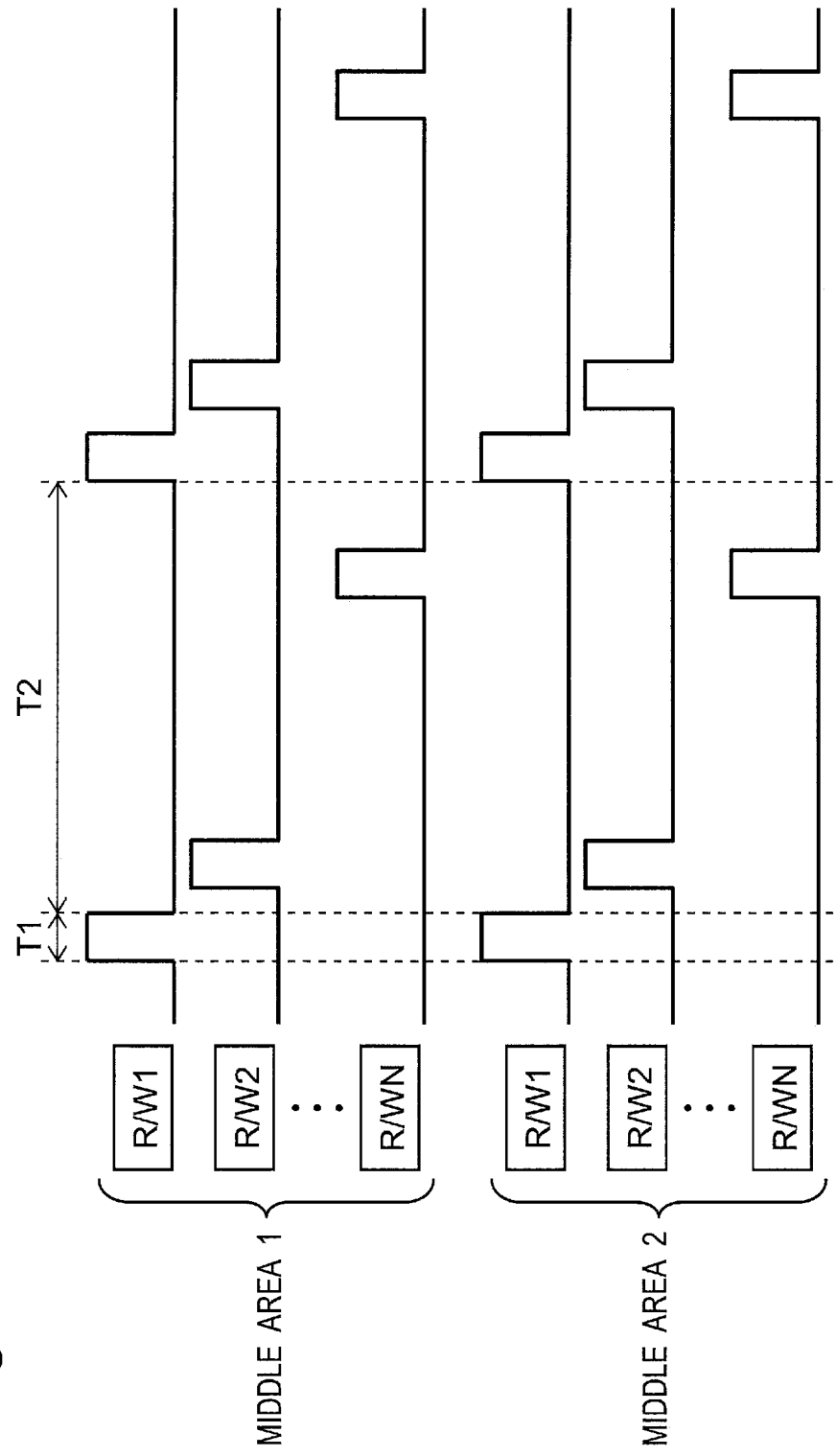
FIG. 14 is a diagram showing operation timing of the plurality of reader/writers arranged in the middle areas, in the article management system of FIG. 11.

FIG. 14 is a diagram showing operation timing of a plurality of reader/writers R/W1 to R/WN arranged in the middle areas 1 and 2. In FIG. 14, T1 is a read time to work the reader/writers R/W. T1 is 1 sec for example. T2 is an idle time to pause the reader/writers R/W. T2 is 14 sec for example. The operation interval (interval time) of the reader/writers R/W1 to R/WN is 0.4 sec for example.

As shown in FIG. 14, the central terminal CT transmits a start command that instructs the start of operation to the reader/writers R/W1 arranged in the areas 1 to M, to cause the reader/writers R/W1 to work for time T1. Afterward, the central terminal CT transmits a stop command that instruct the stop of operation to the reader/writers R/W1, to cause the reader/writers R/W1 to stop for time T2. T2 is set to a time longer than T1×N.

After transmitting the stop command to the reader/writers R/W1, the central terminal CT transmits the start command to the reader/writers R/W2, to cause the reader/writers R/W2 to work for time T1. Afterward, the central terminal CT transmits the stop command to the reader/writers R/W2, to stop the reader/writers R/W2 for time T2.

Subsequently, in the same manner, the central terminal CT transmits the stop command to the reader/writers R/WN−1 and thereafter transmits the start command to the reader/writers R/WN, to cause the reader/writers R/WN to work for time T1. Afterward, the central terminal CT transmits the stop command to the reader/writers R/WN, to stop the reader/writers R/WN for time T2.

In this manner, the central terminal CT operates in order the reader/writers R/W1 to R/WN arranged in the areas 1 to M, intermittently at certain intervals. The central terminal CT controls the reader/writers R/W1 to R/WN arranged in the areas, in such a manner that those operations are repeated. Information of RFID tags read by the reader/writers R/W1 to R/WN is gathered in the central terminal CT for management.

According to the article management system 200 of the first embodiment, when operating a reader/writer R/W in the first middle area, a reader/writer R/W in the second middle area lying outside the range of the radio wave interference distance from the reader/writer R/W is allowed to work. This enables the reader devices arranged in the middle areas to work at the same time, thereby achieving more rapid reading of the RFID tags of a plurality of articles. Furthermore, radio wave interference between a plurality of reader/writers R/W can be suppressed so that the RFID tags of the plurality of articles can be read more reliably.

According to the article management system 200 of the first embodiment, the article management area AE is partitioned into a plurality of middle areas 1 to M such that the distance L between centers of mutually adjacent middle areas is longer than the radio wave interference distance assumed for the reader/writer R/W. According to this configuration, radio wave interference between a plurality of reader/writers R/W can further be suppressed so that the RFID tags of a plurality of articles can be read more reliably.

According to the article management system 200 of the first embodiment, operations of the reader/writers R/W1 to R/WN arranged in the middle areas 1 to M can centrally be managed by the central terminal CT. In consequence, a shift in operation timing of the reader/writers R/W1 to R/WN can be suppressed, thereby making it possible to reduce the mutual interference risk arising from the shift of operations.

The total time of time T1 (read time) and time T2 (idle time) needs to be equal among the reader/writers R/W1 to R/WN, but the ratio between time T1 and time T2 may be different among the reader/writers R/W1 to R/WN unless the read times overlap.

As shown in FIGS. 12 and 13, at least one position tag PT on which position identification information is recorded to manage position information of the reader/writers R/W1 to R/WN may be fixed to the middle areas 1 to M. As a result, the central terminal CT causes a reader/writer R/W and the position tag PT to communicate with each other so that the position of the reader/writer R/W can be identified. For example, the position tag PT may be embedded in the floor of the middle areas 1 to M.

Although in the above the reader/writers R/W1 to R/WN are arranged in all the small areas, the present disclosure is not limited thereto. Two or more reader/writers R/W may be arranged in two or more small areas. In this case, the central terminal CT causes the two or more reader/writers R/W and the position tag PT fixed to the middle areas 1 to M to communicate with each other so that the positions of the two or more reader/writers R/W can be identified. Thus, the central terminal CT operates the two or more reader/writers R/W one by one in the order previously determined for each small area so that it can read information of the RFID tags.

Although in the above the middle areas 1 to M and the small areas are partitioned two-dimensionally, it is noted that the present disclosure is not limited thereto. For example, the middle areas 1 to M and the small areas may be partitioned three-dimensionally.

The reader/writers R/W1 to R/WN may comprise, as described above, the first antenna (first dipole antenna 21) and the second antenna (second dipole antenna 22). In this case, for each of the middle areas 1 to M, the central terminal CT may operate the first antennas of the reader/writers R/W arranged in two or more small areas, in the order previously determined for each small area, and thereafter may operate the second antennas of the reader/writers R/W arranged in the two or more small areas in the order previously determined for each small area. With this configuration, radio wave interference among a plurality of reader/writers R/W can be suppressed and the RFID tags of a plurality of articles can be read more reliably and more rapidly.

Second Embodiment

Figure 15:
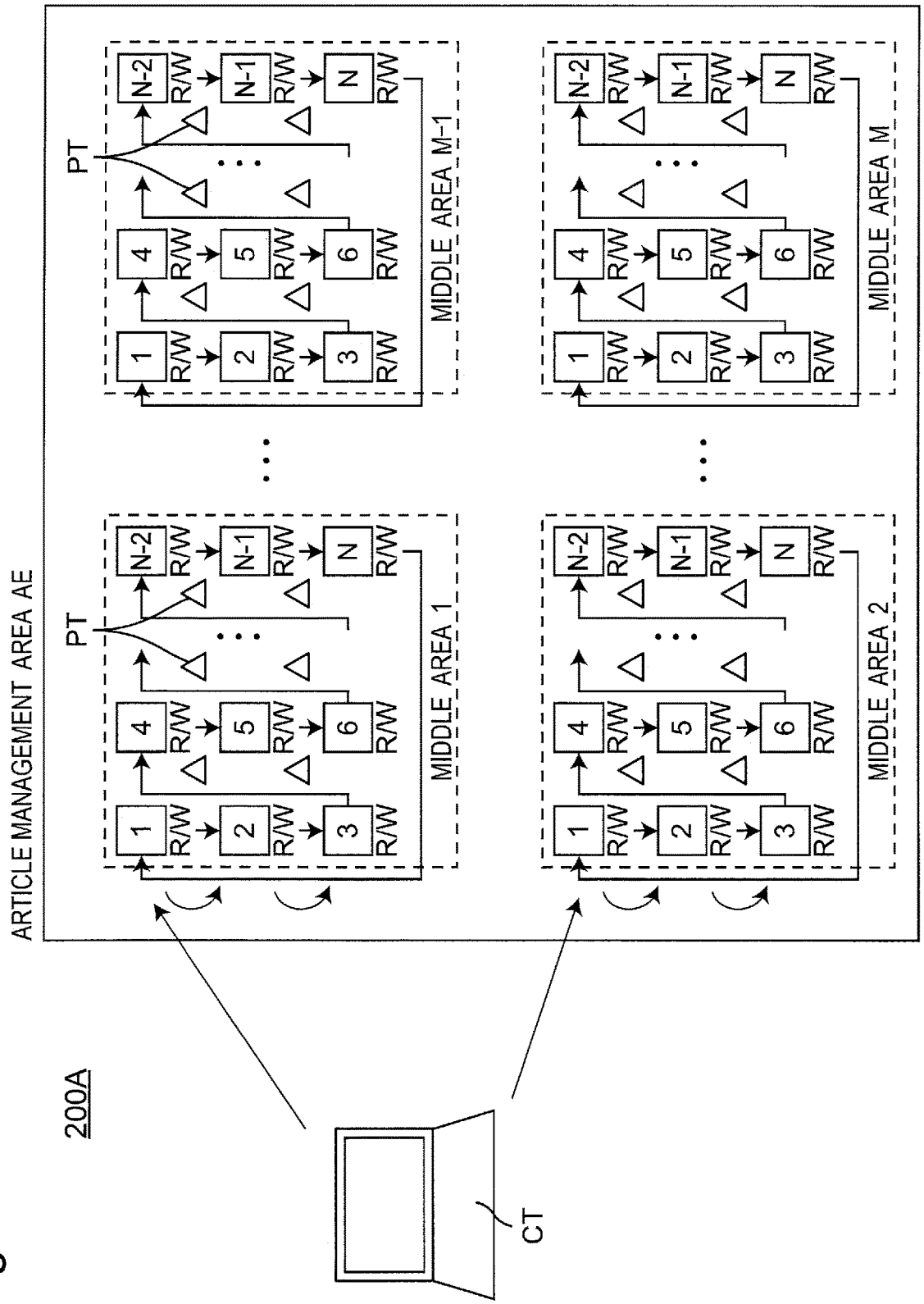
FIG. 15 is a block diagram showing an overall configuration of an article management system according to a second exemplary embodiment of the present disclosure.

FIG. 15 is a block diagram showing a schematic configuration of an article management system 200A according to a second exemplary embodiment of the present disclosure. In FIG. 15, for ease in viewing the diagram, the central terminal CT is shown as controlling RFID tag reading operations of the reader/writers R/W1 in the middle areas 1 and 2.

The article management system 200A according to the second embodiment differs from the article management system 200 according to the first embodiment in that the central terminal CT is configured to cause (or control) specific reader/writers R/W to work in the middle areas 1 to M so that the other reader/writers R/W operate in the order previously determined for each small area, as a result of the operation of the specific reader/writer R/W.

More specifically, in the article management system 200A, the central terminal CT is configured to transmit a start command to only the reader/writers R/W1 arranged in the middle areas 1 to M. When the reader/writers R/W1 receive the start command, the reader/writers R/W1 to R/WN operate in order for time T1. For example, configuration is such that when the reader/writers R/W1 receive the start command, the reader/writers R/W1 directly transmit a start command to the reader/writers R/W2 arranged in the same middle areas 1 to M.

According to the article management system 200A of the second embodiment 2, the central terminal CT may wait until it receives data from the reader/writers R/WN after the transmission of the start command to the reader/writers R/W1. This enables the data traffic of the central terminal CT to be reduced. It is also possible for example to suppress the risk that the reader/writers R/W1 to R/WN arranged in the middle areas 1 to M may fail to receive the start command or the stop command transmitted from the central terminal CT and may not operate.

In the middle areas 1 to M, preferably, information of the RFID tags read by the reader/writers R/W1 to R/WN is gathered into a specific reader/writer R/W and is transmitted to the central terminal CT at different timings. In other words, preferably, the central terminal CT receives information of the RFID tags read by the reader/writers R/W arranged in the middle areas 1 to M, in time division for each middle area. According to this configuration, the central terminal CT can be restrained from failing in the reception as a result of simultaneous reception of a large amount of RFID tag information. Otherwise, a central terminal (sub-central terminal) may be prepared in each of the middle areas 1 to M so that information of the RFID tags read by the reader/writers R/W1 to R/WN is temporarily gathered into the sub-central terminal in each of the middle areas 1 to M so that data is transmitted from each of the sub-central terminal to a main central terminal.

Figure 16:
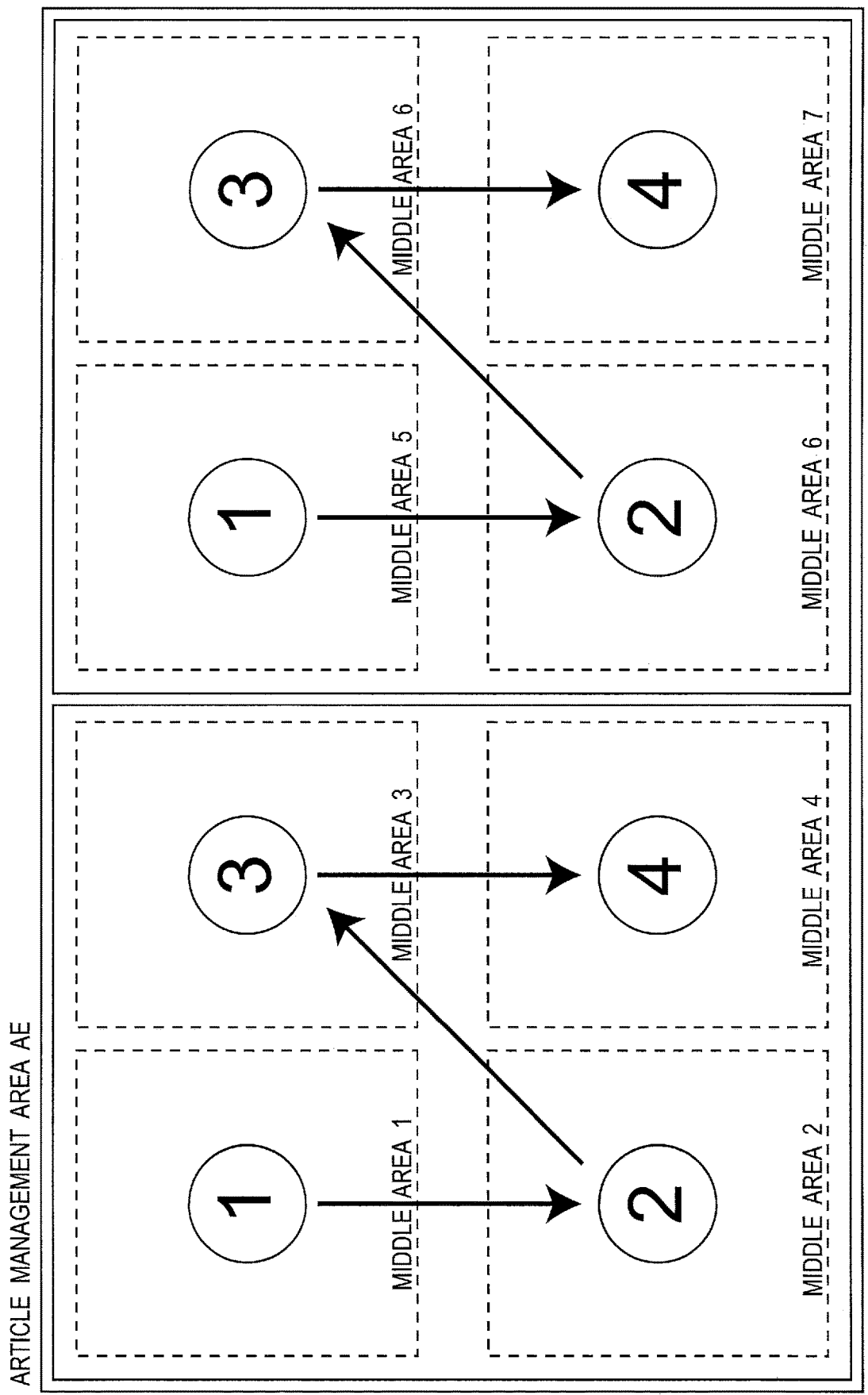
FIG. 16 is an explanatory view showing an variant in which the plurality of reader/writers arranged in the middle areas are operated in order for each middle area.
Figure 17:
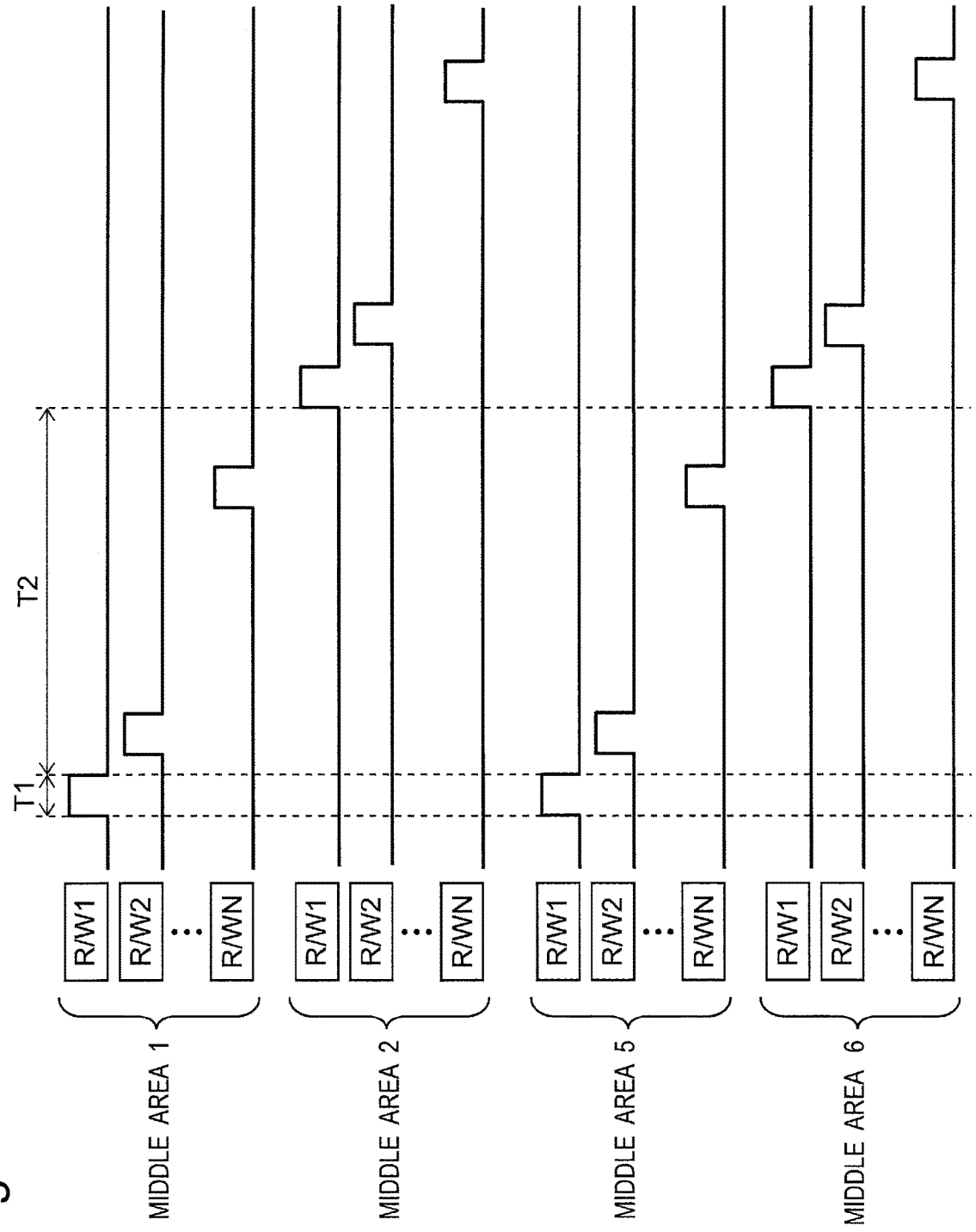
FIG. 17 is a diagram showing operation timing of the reader/writers according to the variant of FIG. 16.

Although in the first and the second embodiments the reader/writers R/W1 arranged in the middle areas 1 to M are simultaneously operated, the present disclosure is not limited thereto. For example, in another exemplary aspect, the reader/writers R/W1 to R/WN arranged in a first middle area and the reader/writers R/W1 to R/WN arranged in a second middle area adjacent to the first middle area may be operated in time division. For example, as shown in FIGS. 16 and 17, the reader/writers R/W1 arranged in the middle area 1 to 4 may be operated in order while the reader/writers R/W1 arranged in the middle areas 5 to 8 may be operated in order. At this time, the reader/writer R/W1 disposed in the middle area 1 and the reader/writer R/W1 disposed in the middle area 5 may simultaneously be operated. According to this configuration, the operation timings of the reader/writers R/W1 to R/WN arranged in the mutually adjacent middle areas can be shifted so that radio wave interference can further be suppressed.

Third Embodiment

Figure 18:
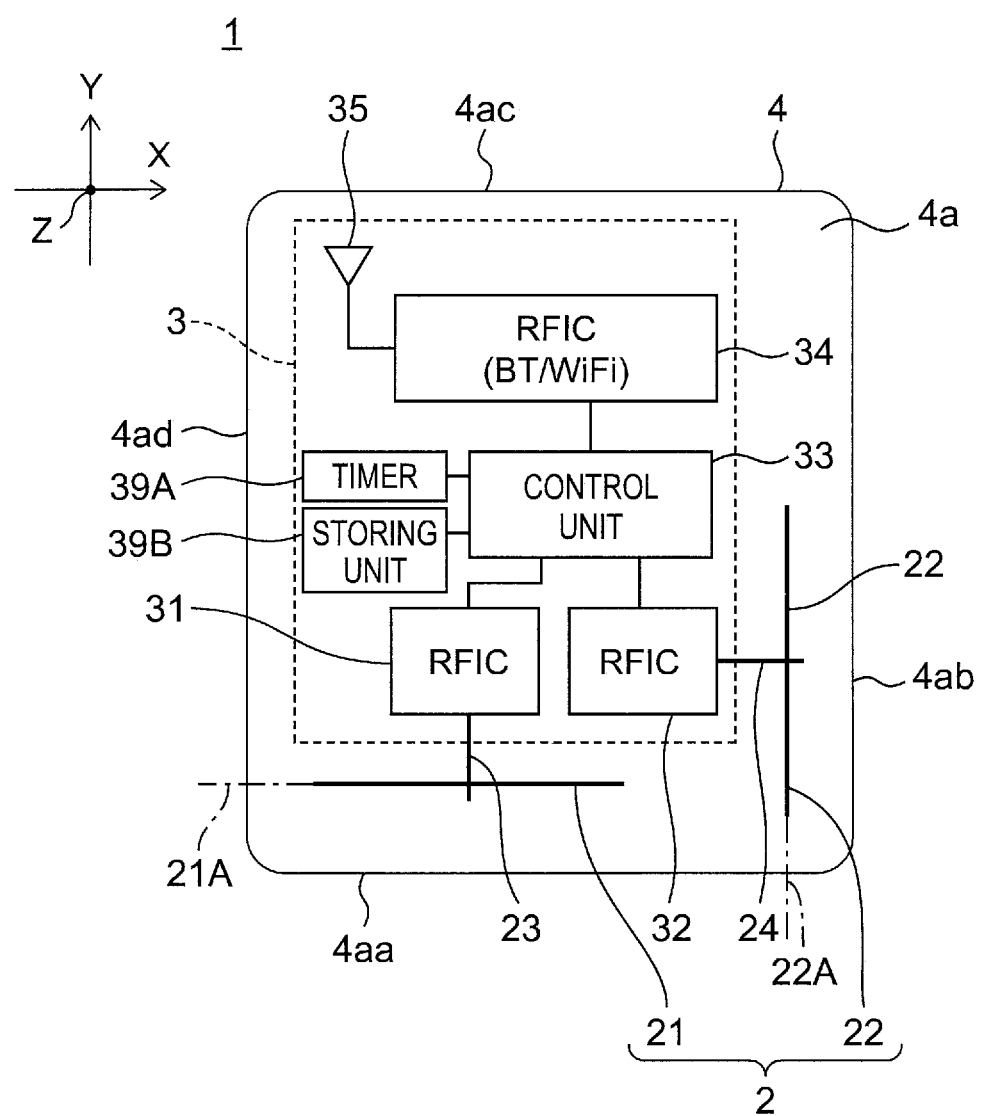
FIG. 18 is a block diagram showing a schematic configuration of a reader device for use in an article management system according to a third exemplary embodiment of the present disclosure.
Figure 19:
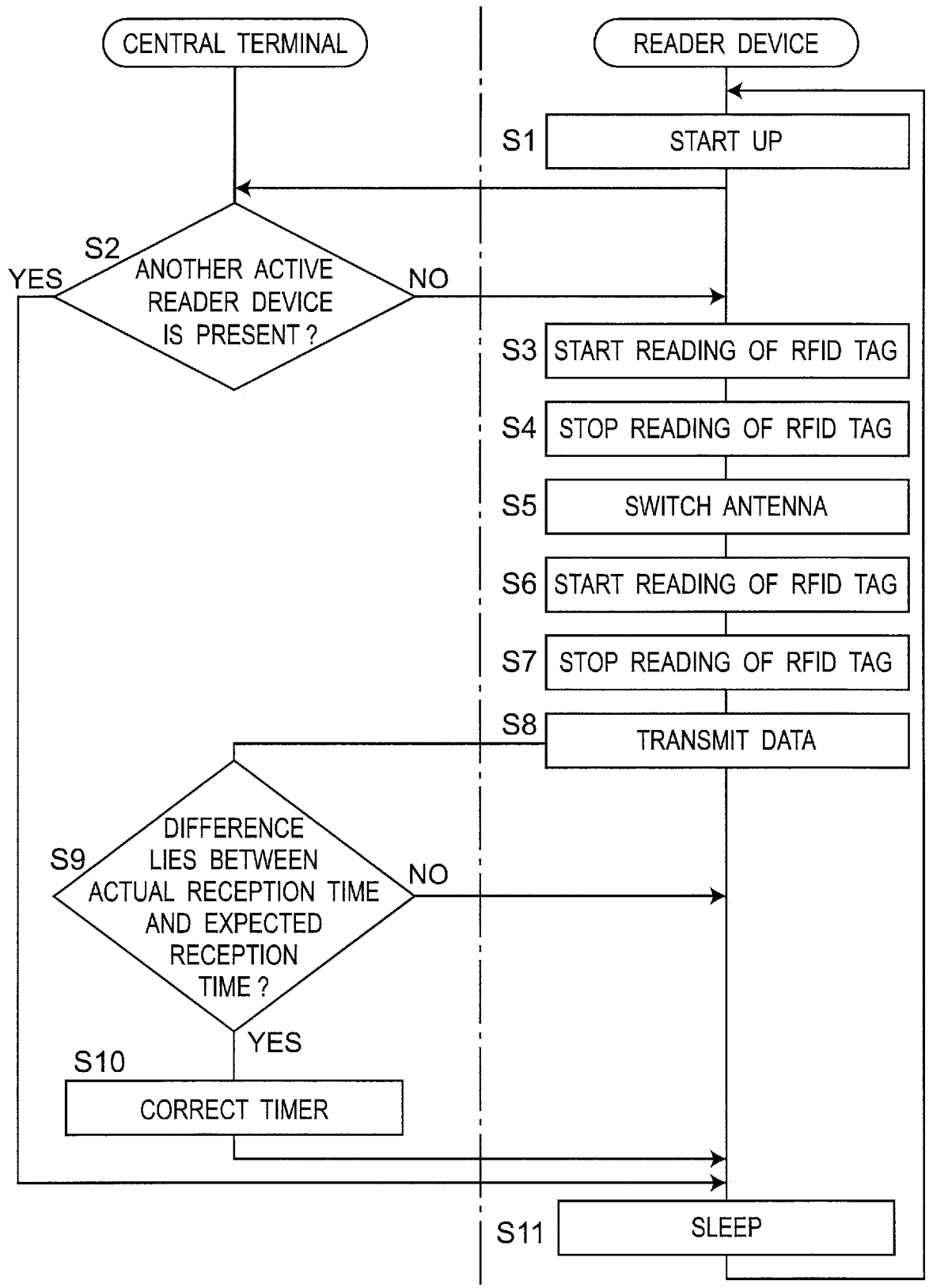
FIG. 19 is a flowchart showing an example of operations of a center terminal and each reader device in the article management system according to the third exemplary embodiment of the present disclosure.

FIG. 18 is a block diagram showing a schematic configuration of a reader device for use in an article management system according to a third exemplary embodiment of the present disclosure. FIG. 19 is a flowchart showing an example of operations of the center terminal CT and each reader device 1 in the article management system according to the third embodiment of the present disclosure.

The article management system according to the third embodiment differs from the article management system 200 of the first embodiment in that the reader device 1 (and each reader device of the system) further comprises a timer 39A and a storing unit 39B. The central terminal CT is configured to cause the storing unit 39B of each reader device 1 to store a start time to start the RFID tag reading operation so that each reader device 1 starts the RFID tag reading operation automatically when the timer 39A reaches the start time.

More specifically, the timer 39A and the storing unit 39B are connected to the control unit 33 as shown in FIG. 18. Via the control unit 33, the central terminal CT causes the storing unit 39B to store the start time to start the RFID tag reading operation. For example, the central terminal CT causes the storing unit 39B of the reader/writer R/W1 in each of the middle areas 1 to M shown in FIG. 12 to store "20:00:00" as the start time. The central terminal CT causes the storing unit 39B of the reader/writer R/W2 in each of the middle areas 1 to M shown in FIG. 12 to store "20:00:15" as the start time. In the same manner, the central terminal CT causes the storing unit 39B of the reader/writer R/WN in each of the middle areas 1 to M shown in FIG. 12 to store "20:29:45" as the start time.

Each reader device 1 is in a sleep state until the timer 39A reaches the start time stored in the storing unit 39B. When the timer 39A reaches the start time stored in the storing unit 39B, the reader device 1 starts up automatically as shown in FIG. 19 (step S1).

Subsequently, the reader device 1 notifies the central terminal CT of the startup and the central terminal CT verifies whether or not another reader device 1 in action is present within the range of the radio wave interference distance of the reader device 1 (Step S2).

If another reader device 1 in action is absent, the reader device 1 starts a RFID tag reading operation (step S3). On the contrary, if another reader device 1 in action is present, the reader device 1 goes into a sleep state instead of staring the RFID tag reading operation (step S11). In this case, the reader device 1 may wait without starting the operation until the another reader device 1 stops the RFID tag reading operation.

The reader device 1 first starts an RFID tag reading operation by the first dipole antenna 21. After reading of the RFID tag through the first dipole antenna 21, the reader device 1 temporarily stops the reading operation (step S4).

Subsequently, the reader device 1 switches the antenna to read the RFID tag from the first dipole antenna 21 to the second dipole antenna 22 (step S5).

Subsequently, the reader device 1 starts an RFID tag reading operation by the second dipole antenna 22 (step S6).

After reading of the RFID tag through the second dipole antenna 22, the reader device 1 stops the reading operation (step S7).

Subsequently, the reader device 1 transmits data (information) read from the RFID tag to the central terminal CT (step S8).

The central terminal CT verifies whether or not there is a difference between actual reception time at which data was received from the reader device 1 and expected reception time previously set for the reader device 1 (step S9). If there is a difference between the actual reception time and the expected reception time, the timer 39A of the reader device 1 is considered not to be functioning properly. Hence, the timer 39A is corrected so that the timer 39A functions properly (step S10). On the other hand, if there is no difference between the actual reception time and the expected reception time, the central terminal CT does not perform the correction for the timer 39A.

Subsequently, the reader device 1 updates the start time stored in the storing unit 39B (so as to start up in 30 min for example), entering a sleep state (step S11).

Subsequently, when the timer 39A reaches the start time (after updating) stored in the storing unit 39B, the reader device 1 again starts up automatically (step S1). Afterward, the steps S1 to S11 are repeated.

According to the third embodiment, configuration is such that after the central terminal CT has caused the storing unit 39B of each reader device 1 to store the start time, each reader device 1 automatically starts the RFID tag reading action. According to this configuration, each reader device 1 can be restrained from failing to receive the start command instructing the start of operation from the central terminal CT and from failing to work. Thus, each reader device 1 can be operated more reliably.

According to the third embodiment, the central terminal CT is configured to correct the timer 39A when the actual reception time and the expected reception time differ. According to this configuration, it can be suppressed that the reader device 1 operates simultaneously with another reader device 1 lying within the range of the radio wave interference distance due to the timer 39A not functioning properly. Therefore, while suppressing the radio wave interference of the reader devices 1 more reliably, the reader devices 1 can continue to work automatically.

Although in the above, at step S2, the central terminal CT verifies whether or not within the range of the radio wave interference distance of a reader device 1 there is another reader device 1, the present disclosure is not limited thereto. For example, in the case of correcting the timer 39A at step S10, the timer 39A is corrected so that when a reader device 1 starts an RFID reading operation there is no another reader device 1 in action. For this reason, step S2 may not be performed. Conversely, if step S2 is performed, steps S9 and S10 may not be performed.

Although in the above a reader device 1 starts an RFID tag reading operation after receiving from the central terminal CT the information of whether or not there is another reader device 1 in action, the present disclosure is not limited thereto. For example, if not receiving the information from the central terminal CT until the lapse of a certain time after startup, the reader device 1 may automatically start the RFID tag reading operation.

Although in the above, at step S11, the start time stored in the storing unit 39B is updated to enter a sleep state, the present disclosure is not limited thereto. For example, setting may such that once each reader device 1 starts the operation, it automatically operate in 30-min intervals for example. In this case, the storing unit 39B has only to store the initial start time.

Although in the above the central terminal CT causes the storing unit 39B to store a single start time to start the RFID tag reading operation, the present disclosure is not limited thereto. For example, the central terminal CT may cause the storing unit 39B to store a plurality of start times to start the RFID tag reading operation. For example, the central terminal CT may cause the storing unit 39B of the reader/writer R/W1 in each of the middle areas 1 to M shown in FIG. 12 to store "20:00:00", "20:30:00", etc. (hereafter, 30-min intervals) as start times. Furthermore, the central terminal CT may cause the storing unit 39B of the reader/writer R/W2 in each of the middle areas 1 to M shown in FIG. 12 to store "20:00:15", "20:30:15", etc. (hereafter, 30-min intervals) as start times. Similarly, the central terminal CT may cause the storing unit 39B of the reader/writer R/WN in each of the middle areas 1 to M shown in FIG. 12 to store "20:29:45", "20:59:45", etc. (hereafter, 30-min intervals) as start times. Also in this case, after the central terminal CT has caused the storing unit 39B of each reader device 1 to store the start time, each reader device 1 can automatically start the RFID tag reading operation, thereby allowing each reader device 1 to work more reliably.

It is to be understood that this disclosure encompasses exemplary combinations of any embodiments and/or examples among the above various embodiments and/or examples, which can present effects provided by each embodiment and/or example.

Advantageously, according to the article management system of the present disclosure, the RFID tags of a plurality of articles can be read more reliably and more rapidly while suppressing radio wave interference among a plurality of reader devices, whereupon it is useful for article management in shops or backyards handing a large amount of articles for example.

What is claimed is:

1. An article management system comprising:
   a plurality of reader devices disposed in an article management area and configured to read information recorded on RFID tags; and
   a central terminal configured to control operations of the plurality of reader devices and to virtually partition the article management area into a plurality of middle areas that are each virtually partitioned into a plurality of small areas,
   wherein the central terminal is configured to cause two or more reader devices disposed in two or more small areas, respectively, in each of the plurality of middle areas to operate sequentially in a predetermined order for each small area to read information of a respective RFID tag,
   wherein a range of a radio wave interference distance for at least one reader device disposed in a first middle area of the plurality of middle areas partially overlaps with a second middle area adjacent to the first middle area,
   wherein, when causing the two or more reader devices disposed in the first middle area to operate sequentially, the central terminal is configured to operate a reader device in the second middle area that is outside the range of the radio wave interference distance from at least one of the two or more reader devices disposed and operating in the first middle area.

2. The article management system of claim 1, wherein the central terminal is configured to substantially equally partition the article management area into a plurality of middle areas.

3. The article management system of claim 2, wherein a distance between centers of the first middle area and the second middle area is longer than the range of the radio wave interference distance.

4. The article management system of claim 1, wherein the central terminal is configured to cause the at least one reader device disposed in the first middle area and at least one reader device disposed in the second middle area to operate in time division.

5. The article management system of claim 1, wherein the central terminal is configured to cause a specific reader device to work in each of the plurality of middle areas so that other reader devices operate in a predetermined order for each small area based on the operation of the specific reader device.

6. The article management system of claim 1,
wherein the at least one reader device is configured to be moved,
wherein at least one position tag having position identification information recorded thereon is fixed in each of the middle areas, respectively, and
wherein the central terminal is configured to cause the at least one reader device to communicate with the position tag to identify a position of the at least one reader device based on the position information.

7. The article management system of claim 1, wherein the central terminal is configured to receive in time division, for each middle area, information of the RFID tags read by the plurality of reader devices, respectively, disposed in each of the respective middle areas.

8. The article management system of claim 1, wherein each of the plurality of reader devices comprises a first antenna and a second antenna.

9. The article management system of claim 8, wherein the central terminal is configured to cause the first antennas of two or more reader devices disposed in two or more small areas, respectively, in each of the plurality of middle areas to operate in a predetermined order for each small area, and thereafter cause the second antennas of the two or more reader devices to operate in a predetermined order for each small area, respectively.

10. The article management system of claim 8, wherein each of the plurality of reader devices comprises a rectangular housing with the first antenna extending in a direction parallel to a first side of the rectangular housing and with the second antenna extending in a direction parallel to a second side of the rectangular housing perpendicular to the first side.

11. The article management system of claim 1,
wherein each of the plurality of reader devices comprises a timer and a storing unit, and
wherein the central terminal is configured to control the storing unit of each reader device to store a start time to start a reading operation of the RFID tag, such that each reader device is configured to start the reading operation of the RFID tag automatically when the timer reaches the start time.

12. The article management system of claim 11, wherein, if an actual reception time at which the central terminal has received information of the RFID tag read by each reader device and an expected reception time previously set for each reader device differ, the central terminal is configured to correct the timer of the respective reader device based on a difference between the actual reception time and the expected reception time.

13. An article management system comprising:
a plurality of reader devices each configured to read information on RFID tags; and
a central controller configured to virtually partition an article management area into a plurality of first areas that are each virtually partitioned into a plurality of smaller second areas,
wherein the central controller is configured to control two or more reader devices disposed in two or more of the second area, respectively, to operate sequentially in a predetermined order to read information of respective RFID tags, and
wherein, when controlling the two or more reader devices disposed in one of the first areas to operate sequentially, the central controller is configured to operate a reader device in a second of the first areas that is outside a range of a radio wave interference distance from the two or more reader devices disposed in the one first area.

14. The article management system of claim 13, wherein the range of the radio wave interference distance for the two or more reader devices disposed in the one first area partially overlaps with the second first area that is adjacent to the one first area.

15. The article management system of claim 13, wherein the central controller is configured to control at least one reader device disposed in the one first area and at least one reader device disposed in the second first area to operate in time division.

16. The article management system of claim 13, wherein each of the plurality of reader devices comprises a first antenna and a second antenna.

17. The article management system of claim 16, wherein the central controller is configured to control the first antennas of two or more reader devices disposed in two or more of the smaller second areas, respectively, in each of the plurality of first areas to operate in a predetermined order for each small second area, and thereafter control the second antennas of the two or more reader devices to operate in a predetermined order for each small second area, respectively.

18. The article management system of claim 16, wherein each of the plurality of reader devices comprises a rectangular housing with the first antenna extending in a direction parallel to a first side of the rectangular housing and with the second antenna extending in a direction parallel to a second side of the rectangular housing perpendicular to the first side.

19. The article management system of claim 13,
wherein each of the plurality of reader devices comprises a timer and a storing unit, and
wherein the central controller is configured to control the storing unit of each reader device to store a start time to start a reading operation of a respective RFID tag, such that each reader device is configured to start the reading operation of the respective RFID tag automatically when the timer reaches the start time.

20. The article management system of claim 19, wherein, if an actual reception time at which the central controller has received information of the RFID tag read by each reader device and an expected reception time previously set for each reader device differ, the central controller is configured to correct the timer of the respective reader device based on a difference between the actual reception time and the expected reception time.

* * * * *